(12) United States Patent
Takeda

(10) Patent No.: US 9,342,848 B2
(45) Date of Patent: May 17, 2016

(54) APPARATUS AND METHOD FOR PROVIDING A SEARCH RESULT WITH POSITION INFORMATION AND RECORDING MEDIUM THEREFOR

(75) Inventor: Seiichi Takeda, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/819,904

(22) PCT Filed: Nov. 30, 2011

(86) PCT No.: PCT/JP2011/077661
§ 371 (c)(1),
(2), (4) Date: Feb. 28, 2013

(87) PCT Pub. No.: WO2013/080329
PCT Pub. Date: Jun. 6, 2013

(65) Prior Publication Data
US 2013/0332314 A1    Dec. 12, 2013

(51) Int. Cl.
*G06Q 30/06* (2012.01)
(52) U.S. Cl.
CPC ........ *G06Q 30/0623* (2013.01); *G06Q 30/0639* (2013.01)
(58) Field of Classification Search
CPC .......... G06Q 30/0623; G06Q 30/0639; G06Q 30/06–30/08; G01C 21/3682
USPC ............. 705/26.9, 26.61, 26.1–27.2; 701/532
See application file for complete search history.

(56) References Cited

U.S. PATENT DOCUMENTS

| | | | |
|---|---|---|---|
| 6,128,571 A | 10/2000 | Ito et al. | |
| 7,945,484 B1 | 5/2011 | Tam et al. | |
| 2007/0064018 A1* | 3/2007 | Shoemaker et al. | 345/660 |
| 2008/0102857 A1* | 5/2008 | Kim | 455/456.3 |
| 2012/0123673 A1* | 5/2012 | Perks et al. | 701/426 |
| 2013/0097163 A1* | 4/2013 | Oikarinen et al. | 707/736 |

FOREIGN PATENT DOCUMENTS

| | | |
|---|---|---|
| CN | 102176206 A | 9/2011 |
| JP | 09-264750 A | 10/1997 |
| JP | 2002-082958 A | 3/2002 |
| JP | 2006-003286 A | 1/2006 |
| JP | 2006-163639 A | 6/2006 |
| JP | 2008-224344 A | 9/2008 |
| WO | 2009/066392 A1 | 5/2009 |
| WO | 2010/085791 A1 | 7/2010 |

OTHER PUBLICATIONS

International Search Report of PCT/JP2011/077661 dated Mar. 13, 2012.

* cited by examiner

*Primary Examiner* — Ethan D Civan
*Assistant Examiner* — Ming Shui
(74) *Attorney, Agent, or Firm* — Sughrue Mion, PLLC

(57) ABSTRACT

The present invention includes acquiring a search word related to a product (S2), and referring to a memory means (12b) which stores position information of a store which provides a product and stock information of a product which the store has and searching for position information of a store which has a predetermined number of stocks of a product which is searched for by the acquired search word (S3 and S4). Further, the present invention includes generating map data (webpage 40) of a map on which information M1 indicating the stores is mapped in accordance with the position information of the searched store (S8), and outputting the map data (S13).

11 Claims, 30 Drawing Sheets

FIG.3

| SEARCH WORD | PRODUCT ID | PRODUCT ID | PRODUCT ID |
|---|---|---|---|
| APPLE | 01234567 | 01234568 | ... |
| ORANGE | 01543210 | 01543211 | ... |
| ... | ... | ... | ... |

| STORE ID | PRODUCT ID | PRODUCT ID | ... | PRODUCT ID | ... | PRODUCT ID |
|---|---|---|---|---|---|---|
| 0000001111 | 01234567 | 01234568 | ... | | ... | |
| 0000001112 | 00000568 | 00000600 | ... | | ... | |
| ... | | | | | | |
| 0000010102 | 01234567 | | ... | 01234570 | ... | |
| ... | | | | | | |
| 0000013210 | 01234555 | | ... | | ... | 01234567 |
| ... | | | | | | |

FIG.4

| STORE ID | ADDRESS | LONGITUDE/LATITUDE INFORMATION | | | |
|---|---|---|---|---|---|
| 0000001111 | ... | (..., ...) | | | |
| 0000001112 | ... | (..., ...) | ... | | ... |
| 0000001113 | ... | (..., ...) | | | |
| ... | | | | | |
| 0000401111 | | | | (..., ...) | ... |
| 0000401112 | | | | (..., ...) | |
| ... | | | | | |

FIG.5

STORE ID : 00000001111

| PRODUCT ID | NUMBER OF STOCKS |
|---|---|
| 01234567 | 2 |
| 02222222 | 0 |
| 03212121 | 10 |
| ... | ... |
| 07654321 | 5 |
| 07777777 | 3 |
| ... | ... |

FIG.6

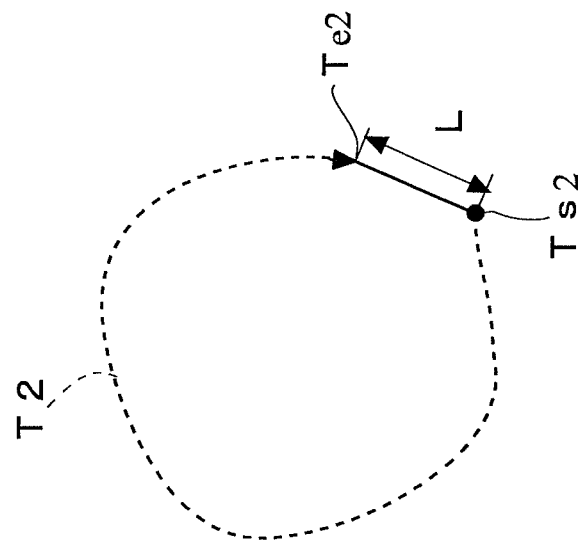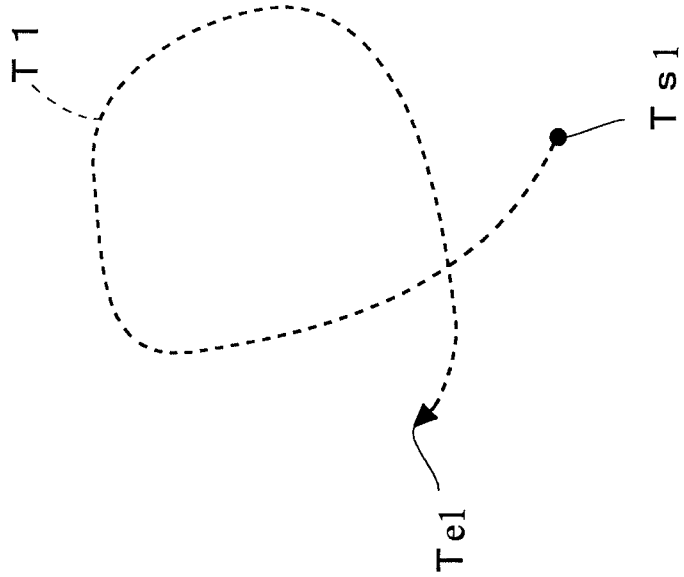
FIG.15

| SEARCH WORD | PRODUCT/SERVICE ID | PRODUCT/SERVICE ID | PRODUCT/SERVICE ID | |
|---|---|---|---|---|
| APPLE | 0001234567 | 0001234568 | 0051234568 | ... |
| ... | | | | |
| MASSAGE | 0070234567 | 0070234568 | 0001234568 | ... |
| ... | | | | |

FIG.19

| STORE ID | PRODUCT/SERVICE ID | PRODUCT/SERVICE ID | ... |
|---|---|---|---|
| 0000001111 | 0001234567 | 0001234568 | ... |
| 0000001112 | 0000000568 | 0000000600 | ... |
| ... | ... | ... | ... |
| 0000010102 | 0001234567 | 0001234570 | ... |
| ... | ... | ... | ... |
| 0000013210 | 0001234555 | 0001234567 | ... |
| ... | ... | ... | ... |
| 1000007777 | 0070234567 | 0070234568 | ... |
| ... | ... | ... | ... |
| 1000005555 | 0070234567 | 0070234577 | ... |
| ... | ... | ... | ... |

FIG.20

STORE ID : 00000001111

| PRODUCT/SERVICE ID | NUMBER OF STOCKS /NUMBER OF AVAILABILITY |
|---|---|
| 0001234567 | 2 |
| 0002222222 | 0 |
| 0003212121 | 10 |
| ... | ... |
| 0007654321 | 5 |
| 0007777777 | 3 |

FIG.21

APPARATUS AND METHOD FOR PROVIDING A SEARCH RESULT WITH POSITION INFORMATION AND RECORDING MEDIUM THEREFOR

CROSS REFERENCE TO RELATED APPLICATIONS

This application is a National Stage of International Application No. PCT/JP2011/077661 filed Nov. 30, 2011, the contents of all of which are incorporated herein by reference in their entirety.

TECHNICAL FIELD

The present invention relates to a technical field of an information processing device, an information processing method, an information processing device program, and a recording medium which generate a search result by a search word.

BACKGROUND ART

Conventionally, there is a technique of displaying on a map a distribution of stores associated with a product name which is searched for by way of keyword search. For example, Patent Document 1 discloses a store information search system which searches for stores for which types of business, company names, product names and areas are set as keywords.

Patent Document 1: Japanese Patent Application Laid-Open No. 2002-082958

SUMMARY OF THE INVENTION

Problem to be Solved by the Invention

However, according to the conventional technique as in Patent Document 1, even though a product name is set as a keyword, whether or not a store is handling a product at a point of time of searching is not known.

The present invention is made in light of such a problem, and an example of a task of the present invention is to provide, for example, information processing of displaying, on a map, stores which handle a search target product at a point of time when the search target product is searched for.

Means for Solving the Problem

In order to solve the above problem, the invention includes: a search word acquiring means that acquires a search word related to a product; a position information searching means that refers to a memory means that stores position information of a store which provides the product and stock information of the product which the store has, and searches for position information of a store which has a predetermined number of stocks of a product or more which is searched for from the search word acquired by the search query acquiring means; a map data generating means that generates map data of a map on which information indicating the store is mapped, in accordance with the position information of the store searched for by the position information searching means; and an output means that outputs the map data.

In the information processing device, the invention further includes: a designated area acquiring means that acquires information related to a designated area designated by being encircled by a user operation on the map of the map data, and is characterized in that the map data generating means maps information indicating stores positioned only in the designated area acquired by the designated area acquiring means, on the map.

In the information processing device, the invention further has: a density calculating means that calculates a density of stores on the map in accordance with the position information of the store searched for by the position information searching means; and an area setting means that sets an area of a predetermined density of the stores or more calculated by the density calculating means, on the map, and is characterized in that the map data generating means generates map data of the map on which the information related to the store is mapped only in the area set by the area setting means.

In the information processing device, the invention is characterized in that the map data generating means generates map data of an emphasized area set by the area setting means.

In the information processing device, the invention further has a specific area acquiring means that, when a plurality of areas are set by the area setting means, acquires information related to a specific area specified by a user operation among the plurality of areas on the map of the map data, and is characterized in that the map data generating means generates map data of an emphasized the designated area.

In the information processing device, the invention is characterized in that the position information searching means searches for the position information in accordance with user store information from a user about the store which has the predetermined number of stocks of a product searched for from the search word acquired by the search word acquiring means.

In the information processing device, the invention further has: a designated position acquiring means that acquires information related to a position designated by a user operation on the map of the map data; and a road specifying means that specifies a road on the map of the map data corresponding to the information related to the designated position acquired by the designated position acquiring means, and is characterized in that the map data generating means generates map data of a map on which information indicating only a store within a predetermined width from the road specified by the road specifying means among stores mapped on the map is mapped.

In the information processing device, the invention further has a trajectory position acquiring means that acquires information related to a position of a trajectory traced by a user operation on the map of the map data, and is characterized in that the map data generating means generates map data of a map on which information indicating only a store within a predetermined width from the trajectory among stores mapped on the map is mapped based on the information related to the position of the trajectory acquired by the trajectory position acquiring means.

In an information processing method of an information processing device which processes information, the invention includes: a search word acquiring step of acquiring a search word related to a product; a position information searching step of referring to a memory means that stores position information of a store which provides the product and stock information of the product which the store has, and searching for position information of a store which has a predetermined number of stocks of a product or more which is searched for from the search word acquired in the search query acquiring step; a map data generating step of generating map data of a map on which information indicating the store is mapped, in accordance with the position information of the store searched for in the position information searching step; and an output step of outputting the map data.

The invention causes a computer to function as: a search word acquiring means that acquires a search word related to a product; a position information searching means that refers to a memory means that stores position information of a store which provides the product and stock information of the product which the store has, and searches for position information of a store which has a predetermined number of stocks of a product or more which is searched for from the search word acquired by the search query acquiring means; a map data generating means that generates map data of a map on which information indicating the store is mapped, in accordance with the position information of the store searched for by the position information searching means; and an output means that outputs the map data.

The invention has a computer-readable information processing device program recorded thereon that causes a computer to function as: a search word acquiring means that acquires a search word related to a product; a position information searching means that refers to a memory means that stores position information of a store which provides the product and stock information of the product which the store has, and searches for position information of a store which has a predetermined number of stocks of a product or more which is searched for from the search word acquired by the search query acquiring means; a map data generating means that generates map data of a map on which information indicating the store is mapped, in accordance with the position information of the store searched for by the position information searching means; and an output means that outputs the map data.

Effect of the Invention

The present invention acquires a search word related to a product, refers to a memory means which stores position information of a store which provides the product and stock information of the product which the store has, and searches for position information of a store which has a predetermined number of stocks of a product or more which is searched for by the acquired search word, generates map data of a map on which information indicating the store is mapped, in accordance with the position information of the searched store, and outputs the map data, so that it is possible to display on the map a distribution of stores which handle a search target product at a point of time when the product is searched for.

BRIEF DESCRIPTION OF THE DRAWINGS

FIG. 3 is a schematic view illustrating an example of data of a correspondence between search words and products.

FIG. 4 is a schematic view illustrating an example of data of a correspondence between stores and products provided by the stores.

FIG. 5 is a schematic view illustrating an example of data of a correspondence between stores and position information of the stores.

FIG. 6 is a schematic view illustrating an example of data of a correspondence between the numbers of stocks of products at a store.

FIG. 15 is a schematic view illustrating an example of a trajectory for designating a designated area.

FIG. 19 is a schematic view illustrating an example of data of a correspondence between search words and products/services in an information processing system according to a second embodiment of the present invention.

FIG. 20 is a schematic view illustrating an example of data of a correspondence between stores and products/services provided by the stores.

FIG. 21 is a schematic view illustrating an example of data of a correspondence of the numbers of stocks of products or the numbers of available services at a store.

MODES FOR CARRYING OUT THE INVENTION

Hereinafter, embodiments of the present invention will be described with reference to the drawings. In addition, the embodiments will be described below where the present invention is applied to an information processing system.

First Embodiment

1. Outline of Configuration and Function of Information Processing System

First, a configuration and a schematic function of an information processing system according to a first embodiment of the present invention will be described using FIG. 1.

Figure 1:
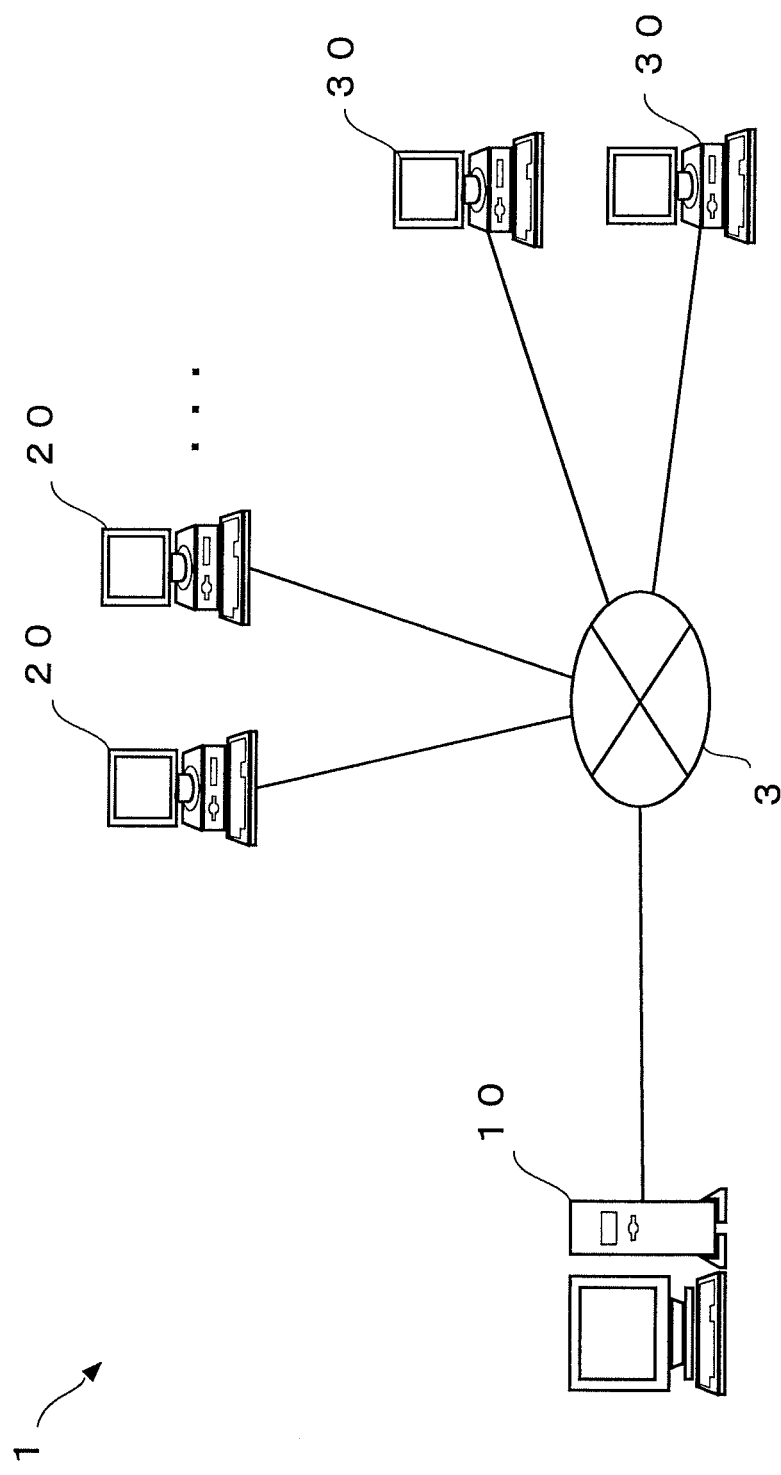
FIG. 1 is a schematic view illustrating a schematic configuration example of an information processing system according to a first embodiment of the present invention.

FIG. 1 is a schematic view illustrating a schematic configuration example of an information processing system 1 according to the present embodiment.

As illustrated in FIG. 1, the information processing system 1 has an information processing server 10 (an example of an information processing device) which is disposed to operate a shopping site and which provides information relates to products and services, store terminal devices 20 of stores which provide products and services to the shopping site, and terminal devices 30 of users who do shopping at the shopping site.

The information processing server 10, the store terminal devices 20 and the terminal devices 30 can transmit and receive data to and from each other using, for example, TCP/IP for a communication protocol through a network 3. In addition, the network 3 is constructed with, for example, Internet, a dedicated communication line (for example, a CATV (Community Antenna Television) line), a mobile communication network (including, for example, base stations), and a gateway.

The store terminal device 20 is a computer of a participant who provides products to a shopping site. The participant registers products or services to provide through the store terminal device 20.

The terminal device 30 is a computer of a user who purchases a product or service at the shopping site. The terminal device 30 has a web browser function, and, when a user searches for a product, transmits a search query to the information processing server 10 and displays a search result and a distribution of stores which provides products or services on a map, on a screen of the web browser.

2. Configuration and Function of Information Processing Server and Each Terminal Device

2.1 Configuration and Function of Information Processing Server 10

Next, a configuration and a function of the information processing server 10 will be described using FIGS. 2 to 6.

Figure 2:
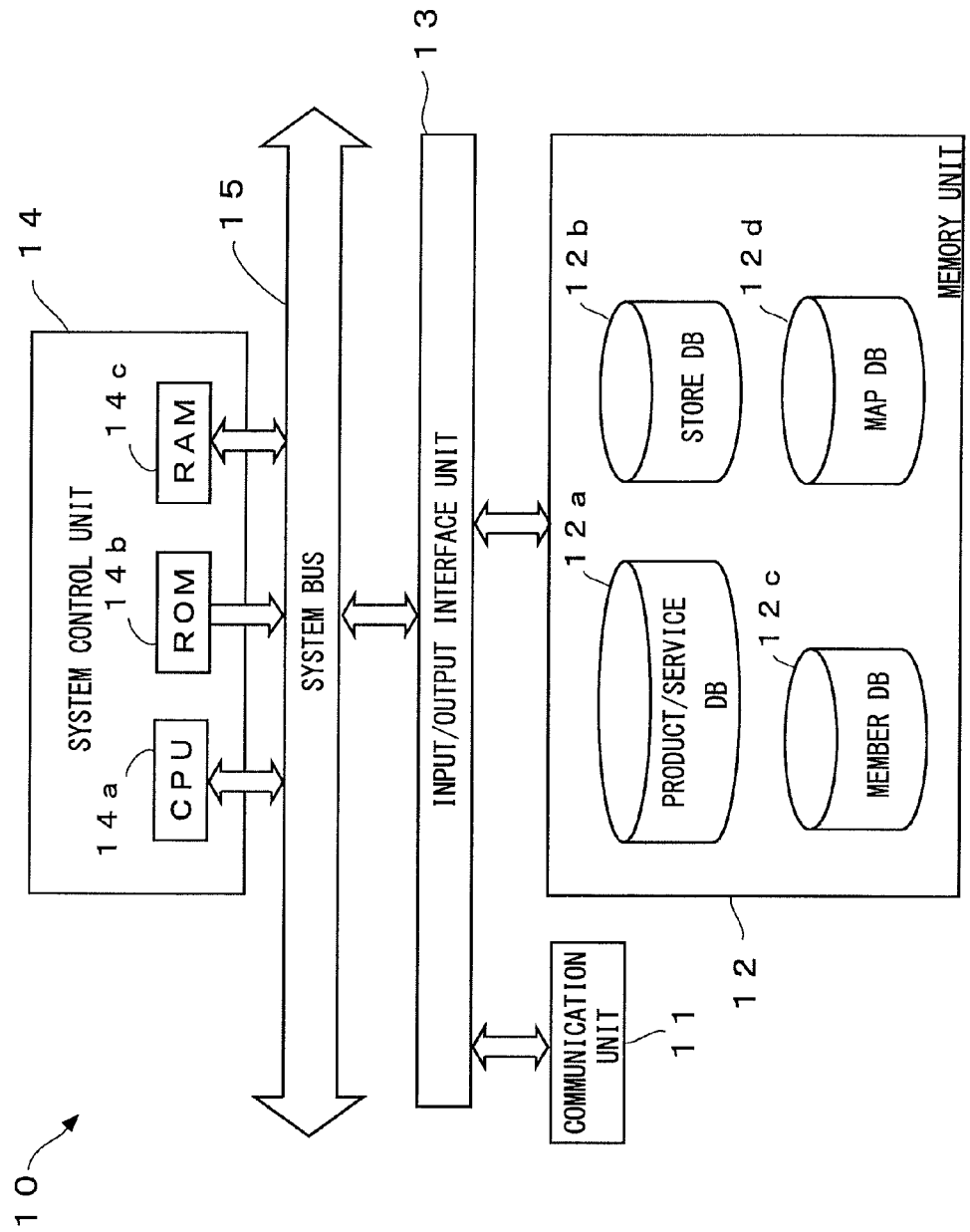
FIG. 2 is a block diagram illustrating an example of a schematic configuration of an information processing server in FIG. 1.

FIG. 2 is a block diagram illustrating an example of a schematic configuration of the information processing server 10. FIG. 3 is a schematic view illustrating an example of data of a correspondence between search words and products. FIG. 4 is a schematic view illustrating an example of data of a correspondence between stores and product provided by the stores. FIG. 5 is a schematic view illustrating an example of data of a correspondence between stores and position information of the stores. FIG. 6 is a schematic view illustrating an example of data of a correspondence between the numbers of stocks of products at a store.

As illustrated in FIG. 2, the information processing server 10 has a communication unit 11, a memory unit 12, an input/output interface unit 13 and a system control unit 14. Further, the system control unit 14 and the input/output interface unit 13 are connected through a system bus 15.

The communication unit 11 connects to the network 3 to control communication states with the store terminal devices 20 and the terminal devices 30.

The memory unit 12 is configured to include, for example, a hard disk drive, and stores various programs such as an operating system and a server program and files of webpages described by, for example, a markup language such as HTML. In addition, for example, the various programs may be acquired from another server device through the network 3 or may be recorded in a recording medium and read through a drive device.

Further, in the memory unit 12, for example, a product/service database 12a (referred to as a "product/service DB 12a" below), a store database 12b (referred to as a "store DB 12b" below), a member database 12c (referred to as a "member DB 12c" below) and a map database 12d (referred to as a "map DB 12d" below) are constructed.

In the product/service DB 12a, product information such as a product name, a type, a product image, a specification and a summary of an introduction of a product and advertisement information are stored in association with, for example, a product ID which is an identifier for identifying, for example, a product.

Further, in the product/service DB 12a, for example, files of product webpages described by, for example, markup languages such as HTML and XML are stored. Furthermore, in the product/service DB 12a, a product/service search database is constructed to search for a product and a service from a search word. As illustrated in FIG. 3, in the product/service DB 12a, search words are stored in association with product IDs. For example, products related to search words such as an apple of a given production area associated with a product ID "01234567" and an "apple juice" associated with a product ID "01234568" are stored for a search word "apple".

Further, in the product/service DB 12a, content tweeted on each product or service, information related to a popular product at a shopping site and information related to a ranking of a search word used for searching are stored. To the tweeted information, a shortened URL (Uniform Resource Locator) related to the tweeted product or service is added.

In the store DB 12b (an example of a memory means), store information such as a store ID, a name, store position information (for example, an address and longitude/latitude), a telephone number and product information of a product provided at the store is registered. This store information can be identified per store from a store ID. Further, in the store DB 12b, as illustrated in FIG. 4, store IDs of stores which provide products and product IDs of products provided by the stores are associated and stored. As illustrated in FIG. 5, store IDs, store addresses and store position information such as longitude/latitude information are associated and stored in the store DB 12b. The longitude/latitude information is stored in the store DB 12b in a format of "(a value of the longitude and a value of the latitude)". Further, as illustrated in FIG. 6, in the store DB 12b, the numbers of stocks of products for products IDs of the products handled at a store are stored per store ID based on stock information of each product transmitted from each store terminal device 20.

In the member DB 12c, user information of user IDs of users registered as members (users of a shopping site), names, addresses, telephone numbers, electronic mail addresses, occupations, hobbies, purchase histories, themes or genres in which users are interested is registered. Further, in the member DB 12c, user IDs, log-in IDs and passwords which users require to log in the shopping site from the terminal devices 30 are registered. Meanwhile, log-in IDs and passwords are log-in information used for log-in processing (user authentication processing).

In the map DB 12d, map data which associates image information of a map and an address and longitude/latitude information is stored. The image information of the map is, for example, image information of the map tiled in accordance with a scale size of the map.

The input/output interface unit 13 performs interface processing between the communication unit 11 and the memory unit 12, and the system control unit 14.

The system control unit 14 has, for example, a CPU (Central Processing Unit) 14a, a ROM (Read Only Memory) 14b and a RAM (Random Access Memory) 14c. Further, when the CPU 14a reads and executes various programs stored in the ROM 14b and the memory unit 12, the system control unit 14 functions as, for example, a map data generating means which generates map data of a map on which information indicating stores is mapped in accordance with position information of searched stores.

2.2 Configuration and Function of Store Terminal Device 20

Next, a configuration and a function of the store terminal device 20 will be described using FIG. 7.

Figure 7:
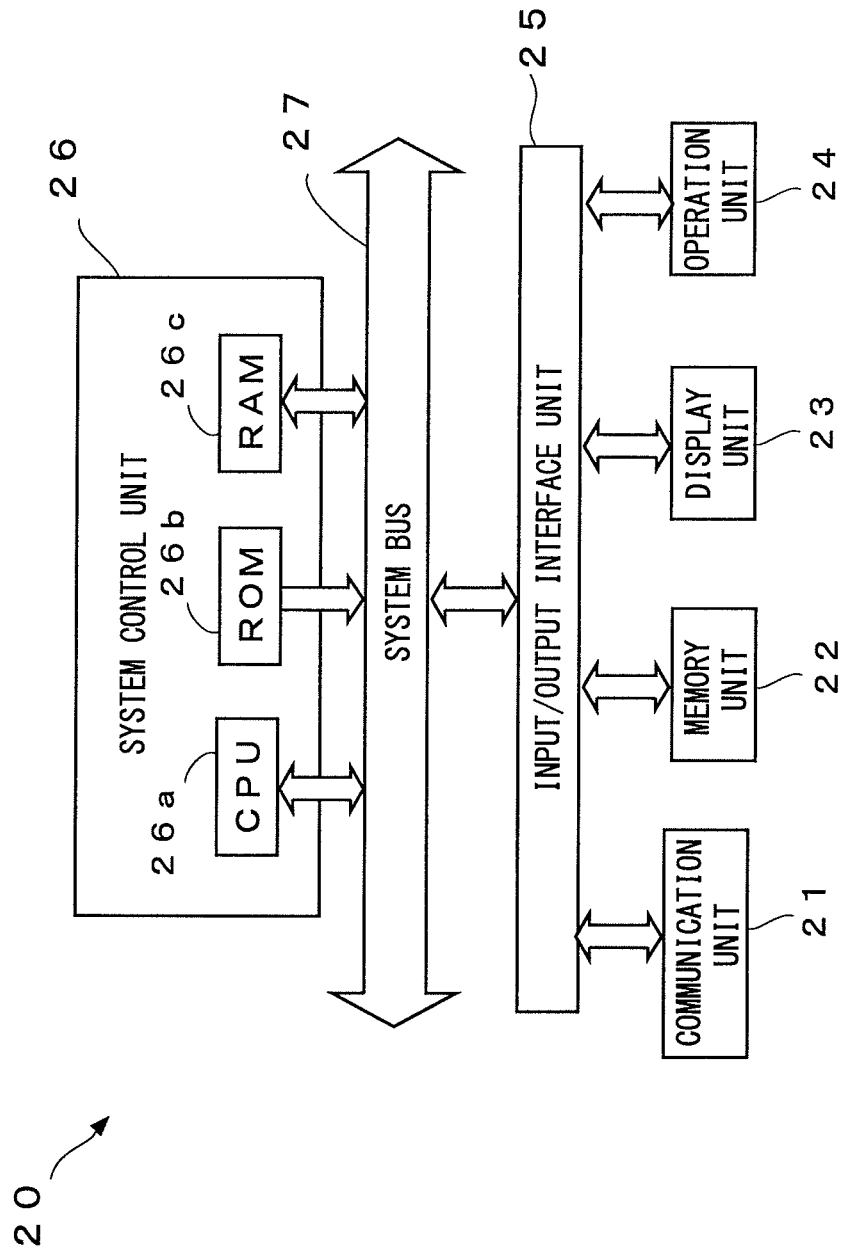
FIG. 7 is a block diagram illustrating an example of a schematic configuration of a store terminal device in FIG. 1.

FIG. 7 is a block diagram illustrating an example of a schematic configuration of the store terminal device 20.

As illustrated in FIG. 7, the store terminal device 20 which functions as a computer is, for example, a personal computer or a mobile wireless telephone such as a smart phone or a PDA, and has a communication unit 21, a memory unit 22, a display unit 23, an operation unit 24, an input/output interface unit 25 and a system control unit 26. Further, the system control unit 26 and the input/output interface unit 25 are connected through a system bus 27.

The communication unit 21 controls communication with, for example, the information processing server 10 through the network 3. In addition, when the store terminal device 20 is a mobile terminal device, the communication unit 21 has a wireless communication function to connect to a mobile communication network of the network 3.

The memory unit 22 includes, for example, a hard disk drive, and stores, for example, programs such as an operating system and a web browser and programs such as a web browser tool bar.

The display unit 23 is formed with, for example, liquid crystal display elements or EL (Electro Luminescence) elements, and has a function of a display panel of the touch/switch system like a touch panel.

The operation unit 24 is formed with, for example, a keyboard and a mouse. Further, the operation unit 24 acquires information about a position on the display unit 23 which a user touches or comes close to according to the touch/switch system of the display unit 23, or acquires information about a position pointed by a pointer according to an operation of the mouse. Operation information of a user is acquired from the operation unit 24.

The input/output interface unit 25 is an interface between the communication unit 21 and the memory unit 22, and the system control unit 26.

The system control unit 26 has, for example, a CPU 26a, a ROM 26b and a RAM 26c. When the CPU 26a reads the various programs stored in the ROM 26b, the RAM 26c and the memory unit 22, the system control unit 26 executes the programs. For example, the system control unit 26 executes a web browser program, and functions as a web browser.

2.3 Configuration and Function of Terminal Device 30

Next, a configuration and a function of the terminal device 30 will be described using FIG. 8.

Figure 8:
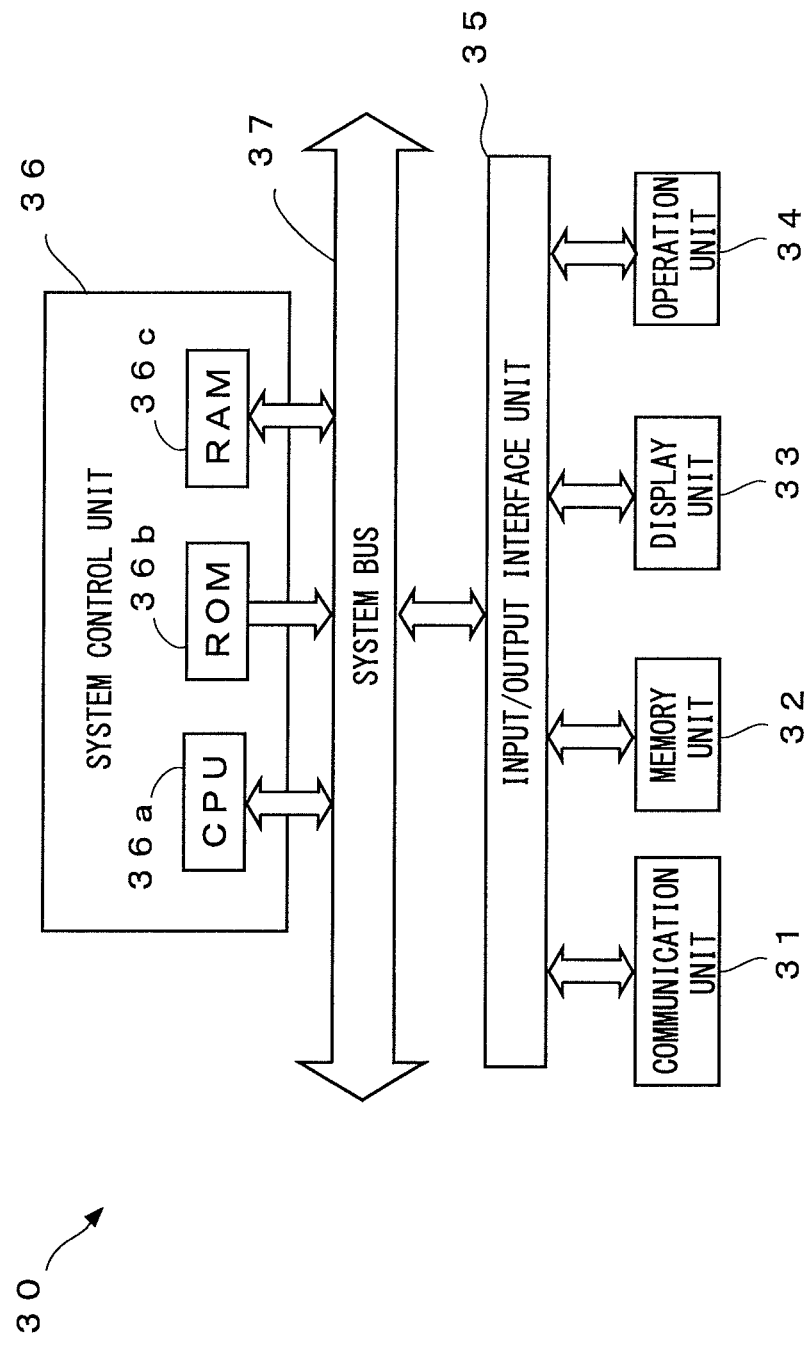
FIG. 8 is a block diagram illustrating an example of a schematic configuration of a terminal device in FIG. 1.

FIG. 8 is a block diagram illustrating an example of a schematic configuration of the terminal device 30.

Similar to, for example, the store terminal device 20, as illustrated in FIG. 8, the terminal device 30 which functions as a computer is, for example, a personal computer or a mobile wireless telephone such as a smart phone or a PDA, and has a communication unit 31, a memory unit 32, a display unit 33, an operation unit 34, an input/output interface unit 35 and a system control unit 36. Further, the system control unit 36 and the input/output interface unit 35 are connected through a system bus 37.

In addition, the configuration and the function of the terminal device 30 are substantially the same as the configuration and the function of the store terminal device 20, and therefore will not be described in detail. Further, a webpage for searching for a product, a webpage for a search result and a webpage indicating a distribution of stores on a map are displayed on the display unit 33 by a web browser. Furthermore, information about a user operation with respect to the displayed map is acquired by a user operation with respect to the display unit 33 of the touch panel or an operation of the operation unit 34 such as a user operation using the mouse.

Still further, the terminal device 30 has a GPS (Global Positioning System) function of acquiring information related to a current position of the terminal device 30.

3. Operation of Information Processing System

Next, an operation of the information processing system 1 according to the first embodiment of the present invention will be described using FIGS. 9 to 12.

Figure 9:
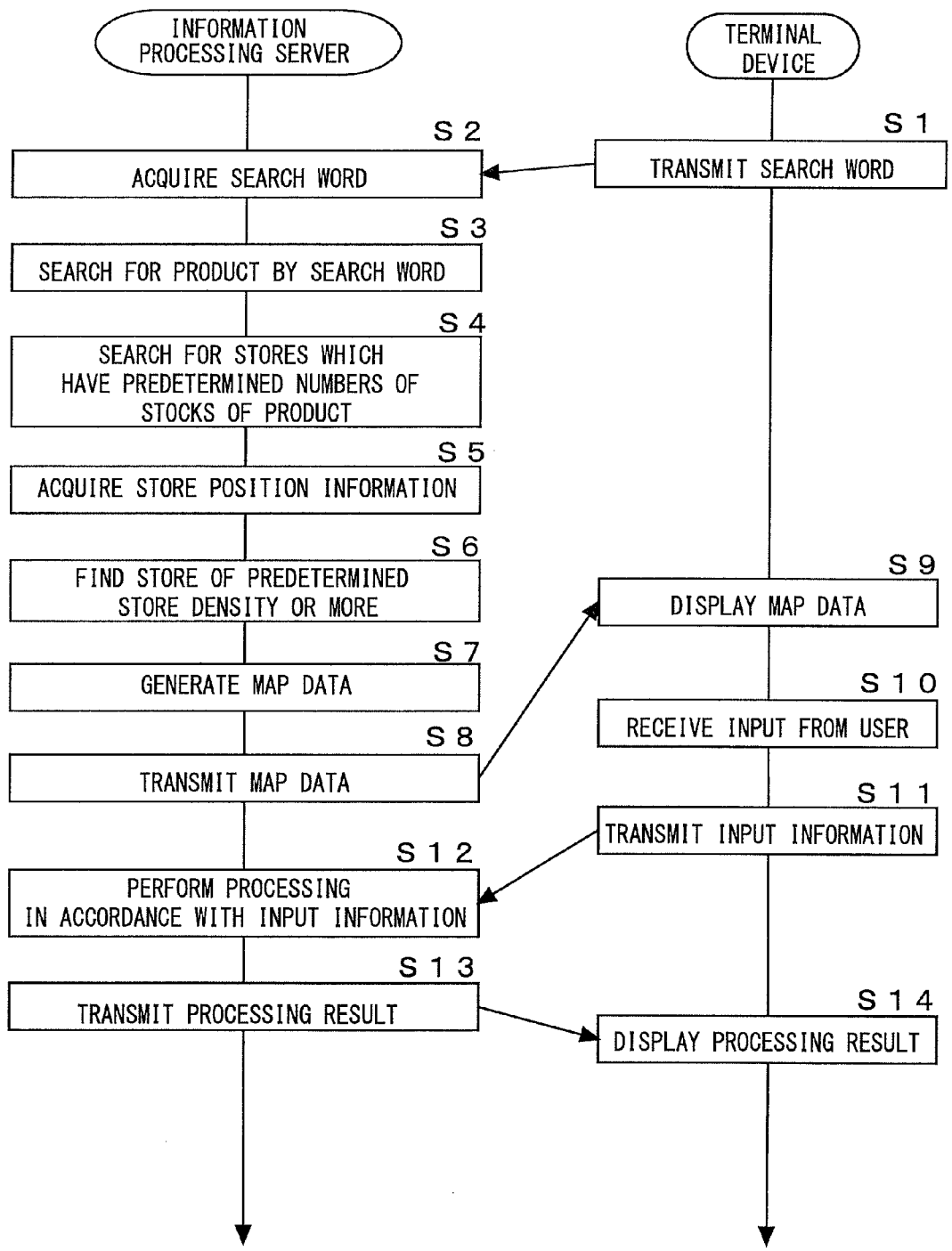
FIG. 9 is a sequence diagram illustrating an example of an operation of the information processing server in FIG. 1 according to the first embodiment.
Figure 10:
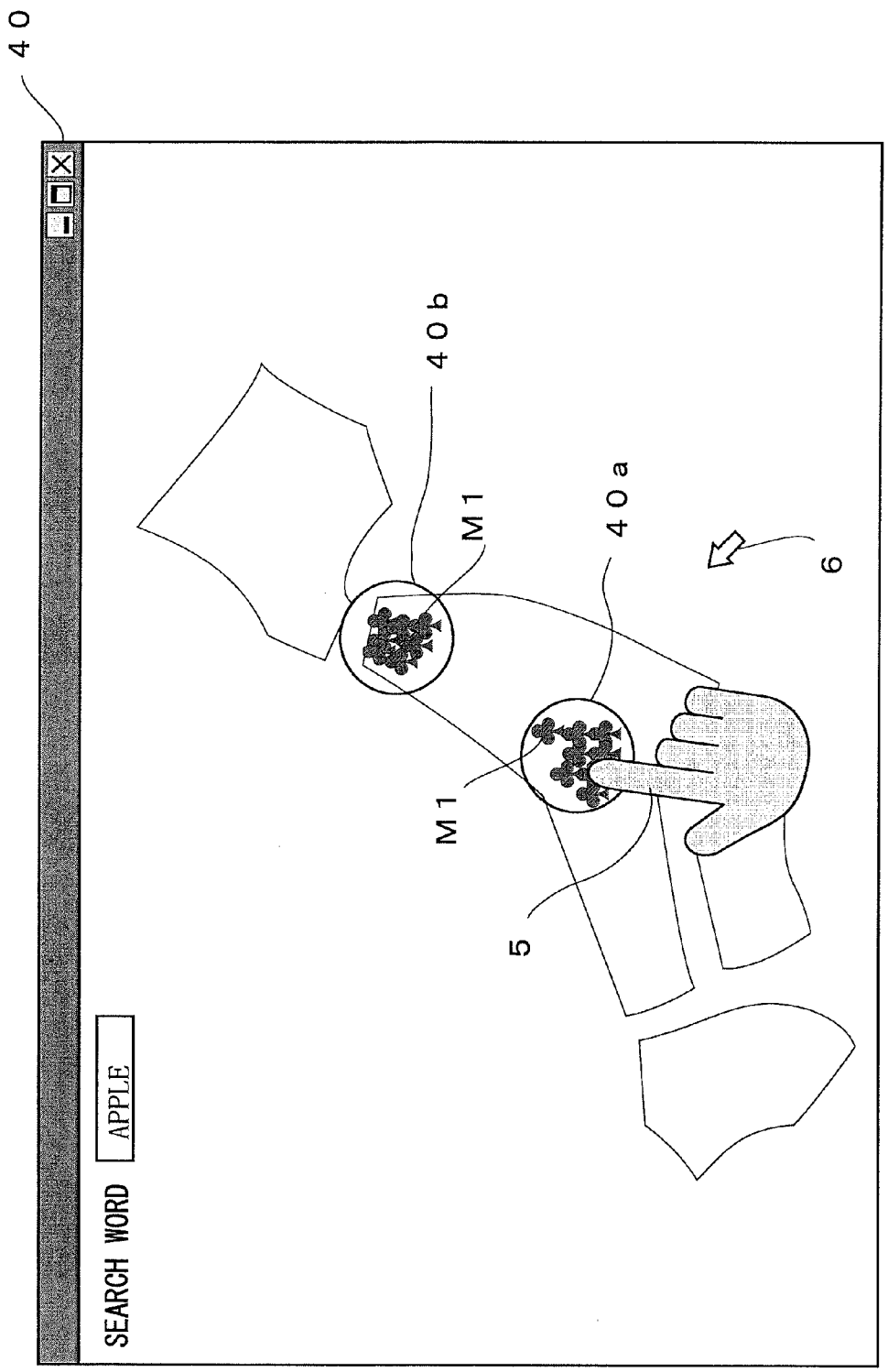
FIG. 10 is a schematic view illustrating an example of display of map data generated by processing in FIG. 9.
Figure 11:
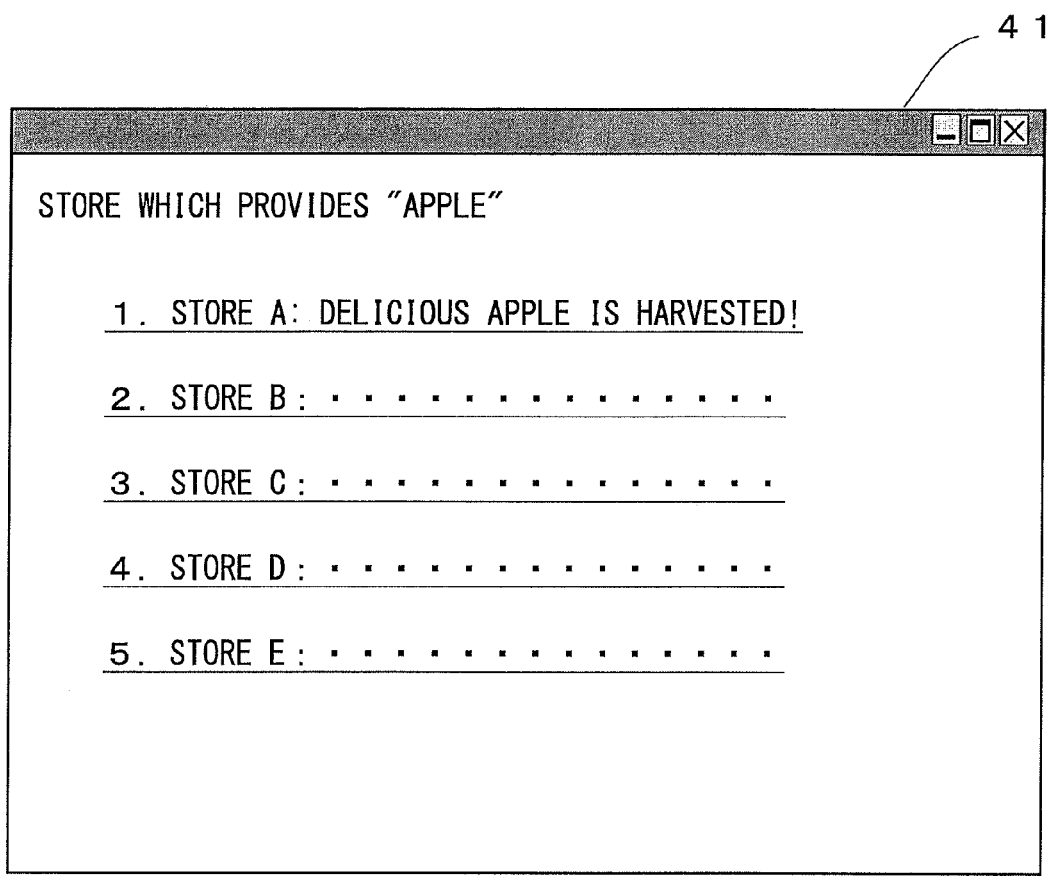
FIG. 11 is a schematic view illustrating an example of display designated by a user in FIG. 10.
Figure 12:
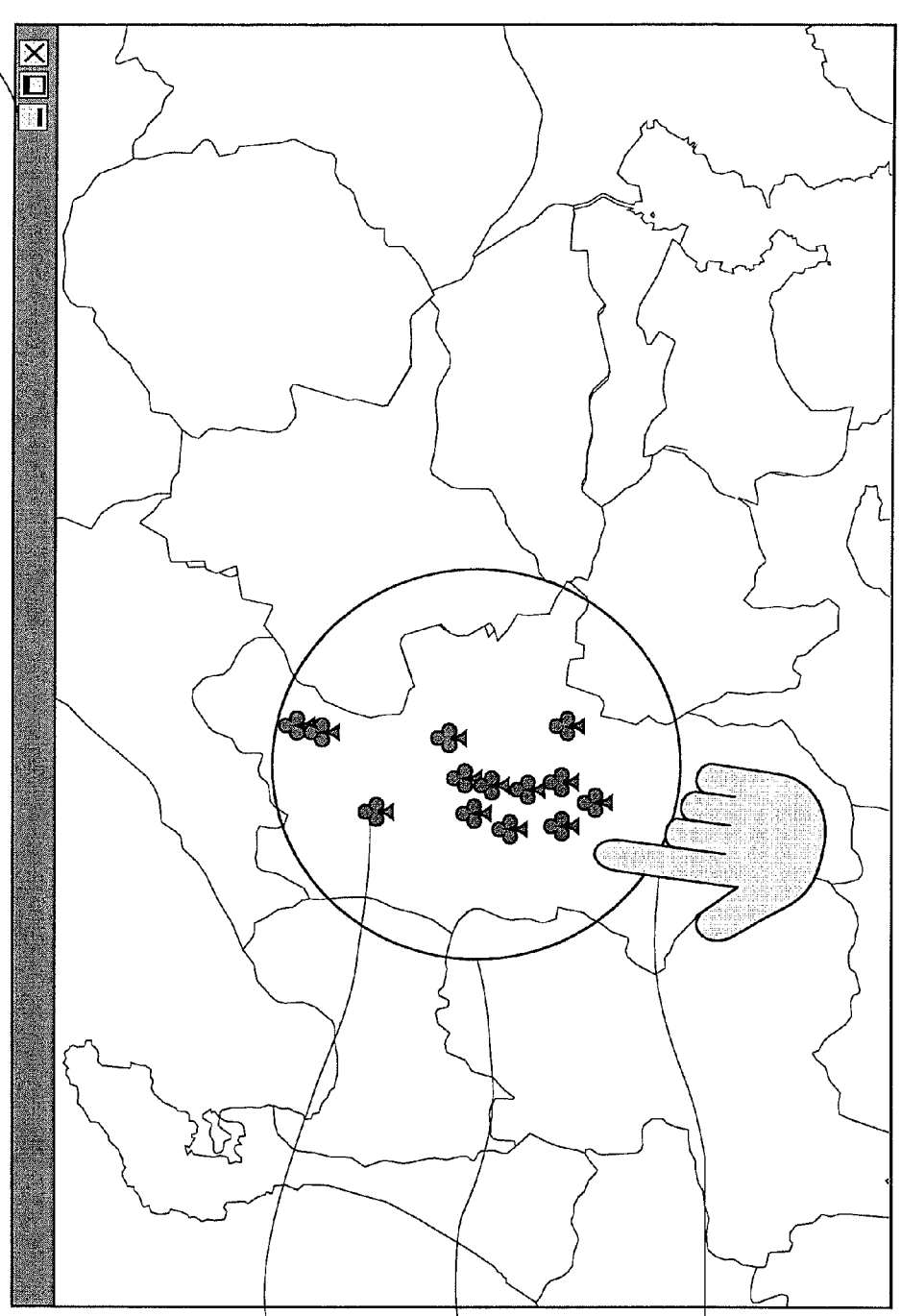
FIG. 12 is a schematic view illustrating an example of display designated by a user in FIG. 10.

FIG. 9 is a sequence diagram illustrating an example of an operation of the information processing server 10 according to the first embodiment. FIG. 10 is a schematic view illustrating an example of display of generated map data. FIGS. 11 and 12 are schematic views illustrating examples of display designated by a user.

3.1 Operation Example of Information Processing System

As illustrated in FIG. 9, the terminal device 30 transmits a search word (step S1). A user who is searching for a product as a search target inputs a search word (an example of a search word related to a product) such as an "apple" in a webpage for product search displayed on the display unit 33 of the terminal device 30. When a search button of this webpage is clicked or tapped, the system control unit 36 of the terminal device 30 transmits the search word to the information processing server 10.

Next, the information processing server 10 acquires the search word from the terminal device 30 (step S2). Thus, the information processing server 10 functions as an example of a search word acquiring means which acquires the search word related to the product.

Next, the information processing server 10 searches for a product by the search word (step S3). More specifically, as illustrated in FIG. 3, the system control unit 14 of the information processing server 10 refers to the product/service DB 12a which stores data of the correspondence between search words and products, searches for a product by the acquired search word and finds a product ID corresponding to the search word.

Next, the information processing server 10 searches for stores which have a predetermined number of stocks of the product or more (step S4). More specifically, as illustrated in FIG. 4, the system control unit 14 of the information processing server 10 refers to the store DB 12b which stores data of the correspondence between stores and products provided by the stores, searches for stores corresponding to the found product IDs, and finds store IDs corresponding to the product IDs. Further, as illustrated in FIG. 6, the system control unit 14 of the information processing server 10 refers to the store DB 12b which stores data of the correspondence between the numbers of stocks of products at a store, and finds the numbers of stocks of products of each store corresponding to the found store IDs and product IDs. When the found numbers of stocks are a predetermined number or more, the system control unit 14 of the information processing server 10 obtains as a store search result stores which have a predetermined number of stocks of a product or more.

Next, the information processing server 10 acquires position information of a store (step S5). More specifically, as illustrated in FIG. 5, the system control unit 14 of the information processing server 10 refers to the store DB 12b which stores data of the correspondence between stores and position information of the stores, and acquires position information of stores such as addresses or longitude/latitude corresponding to store IDs of stores which have a predetermined number of stocks of a product or more corresponding to a search word.

Next, the information processing server 10 finds a store of a predetermined store density or more (step S6). More specifically, the system control unit 14 of the information processing server 10 partitions the entire map to be displayed to unit areas having predetermined areas. Further, the system control unit 14 of the information processing server 10 finds the number of stores in each partitioned unit area based on the acquired position information of the stores, and calculates the density of stores on the map. Furthermore, the system control unit 14 of the information processing server 10 finds stores of a predetermined store density or more.

Thus, the information processing server 10 functions as an example of a density calculating means which calculates the density of stores on the map in accordance with the position information of the stores searched for by the position information searching means. Further, the information processing server 10 functions as an example of an area setting means which sets on the map an area of a predetermined store density or more calculated by the density calculating means.

In addition, the system control unit 14 of the information processing server 10 may calculate the distance to each store from the longitude/latitude information, form a cluster of stores within a predetermined distance and, when the number of clusters is a predetermined number or more, find stores included in the cluster assuming that a store density is a predetermined store density or more. Further, stores of a predetermined store density or more are found to find an area (condition matching area) which matches conditions for displaying the area on the map.

Next, the information processing server 10 generates map data (step S7). More specifically, as illustrated in FIG. 10, the system control unit 14 of the information processing server 10 generates a webpage 40 of a HTML format which includes store display areas 40a and 40b (examples of areas of a predetermined store density or more) in which stores concentrate and stores of a predetermined store density or more are displayed. In the display areas 40a and 40b of the webpage 40, stores of the predetermined store density or more are mapped at positions on the map in accordance with the position information of the stores as indicated by marks M1 (an example of information related to stores).

The system control unit 14 of the information processing server 10 refers to the map DB 12, acquires map information to display on the webpage 40, maps the marks M1 indicating stores on the acquired information in accordance with the position information of the stores and displays outer frames of the store display areas 40a and 40b. Further, the webpage 40 also displays information about the map outside the store display areas 40a and 40b, and displays an input search word. In addition, the shape of the marks M1 which are an example of information related to stores may be a dot or a circle as long as stores can be identified on the map.

Next, the information processing server 10 transmits the map data (step S8). More specifically, the system control unit of the information processing server 10 transmits information of the webpage 40 which is an example of the generated map data, to the terminal device 30 which has transmitted the search word. Thus, the information processing server 10 functions as an example of an output means which outputs the map data.

Next, the terminal device 30 displays the map data (step S9). More specifically, the system control unit 36 of the terminal device 30 has the display unit 33 display the webpage 40 as illustrated in FIG. 10, based on the information of the webpage 40 received from the information processing server 10.

Next, the terminal device 30 receives an input from the user (step S10). When the store display area 40a on the display unit 33 is tapped by a finger 5 of the user as illustrated in FIG. 10, the system control unit 36 of the terminal device 30 acquires information about coordinates of a position tapped on the display unit 33. In addition, when the user moves a pointer 6 to the display area 40 by the mouse of the operation unit 34 and clicks the mouse, the system control unit 36 of the terminal device 30 acquires information of the position coordinates of a clicked position. Further, the tapped or clicked position may be anywhere in the display area 40a.

Next, the terminal device 30 transmits input information (step S11). The system control unit 36 of the terminal device 30 decides whether or not the tapped position coordinates on the display unit 33 are in the store display area 40a, and, when the position coordinates are in the store display area 40a, transmits input information that the display area 40a is instructed, to the information processing server 10.

Next, the information processing server 10 performs processing in accordance with input information (step S12). More specifically, the system control unit 14 of the information processing server 10 receives the input information that the display area 40a is instructed, and generates a webpage 41 of a list of stores in the display area 40a as illustrated in FIG. 11. Further, as illustrated in FIG. 12, the system control unit 14 of the information processing server 10 generates a webpage 42 of map data of an enlarged vicinity of the display area 40a (an example of map data of an emphasized area set by the area setting means) without displaying the display area 40b. In addition, the system control unit 14 of the information processing server 10 may choose which one of the webpage 41 and the webpage 42 is generated depending on how the display unit 33 is tapped (for example, one tap or double tap).

Thus, the information processing server 10 functions as a specific area acquiring means which, when a plurality of areas (store display areas 40a and 40b) are set by the area setting means, acquires information related to a specific area (store display area 40a) specified by a user operation among the plurality areas on the map of map data. Further, the information processing server 10 functions as an example of a map data generating means which generates map data (webpage 42) of the emphasized the designated area.

Next, the information processing server 10 transmits a processing result (step S13). More specifically, the system control unit 14 of the information processing server 10 transmits information of the webpage 41 of the list of the stores or information of the webpage 42 of the enlarged map data, to the terminal device 30.

Next, the terminal device 30 displays a processing result (step S14). More specifically, the system control unit 36 of the terminal device 30 has the display unit 33 display the webpage 41 as illustrated in FIG. 11 or the webpage 42 as illustrated in FIG. 12 based on the received information of the webpage 41 or the webpage 42.

Further, when the webpage 42 illustrated in FIG. 12 is displayed, the step may return to step S10, the terminal device 30 may receive an input from the user and the information processing server 10 may generate the webpage 41 illustrated in FIG. 11 in step S12 if the position coordinates tapped on the display unit 33 is in the store display area 40a.

According to the present embodiment, by acquiring a search word related to a product, referring to the store DB 12b (an example of a memory means) which stores position information of stores which provides products and stock information of products which the stores have, and searching for position information of stores which have a predetermined number of stocks of a product searched for from the acquired search word, generating the webpages 40 and 42 (map data) of a map on which marks M1 (an example of information indicating stores) are mapped in accordance with the searched position information of the stores, and outputting the map data, it is possible to display on the map a distribution of stores which handle a search target product at a point of time when the product is searched for.

Consequently, it is possible to comprehend on a map the distribution of the stores which handle a product at a point of time when the user searches for the product, and, if there is a product which the user wants to buy, immediately purchase the product. Meanwhile, when stores which cannot currently sell a product are displayed without taking into account the number of stocks, users access these stores, and, if the users know that there is no stock, the users have to find another store.

Further, the stores are narrowed down, so that it is possible to reduce the number of drawing objects such as the marks M1 to be displayed, improve a processing speed and save a memory to use.

When the density of stores on the map is calculated in accordance with searched position information of stores, areas of a predetermined calculated store density or more (store display areas 40a and 40b) are set on the map, map data of a map on which the marks M1 are mapped only in the set areas is generated, the condition matching areas (store display areas 40a and 40b) and stores included in the other areas are identifiably displayed, so that the user can easily select a store included in the condition matching areas.

Further, when map data of emphasized set areas is generated by, for example, displaying only the display areas 40a and 40b of stores of a predetermined store density or more as illustrated in FIG. 10 and enlarging the store display area 40a as illustrated in FIG. 12, an area which displays stores to be presented to the user is automatically focused and emphasized, so that the user can easily select a store and access information which the user desires. Particularly when the store display area 40a is automatically enlarged, the user does not need to perform an enlarging operation.

Further, when a plurality of areas are set as illustrated in FIG. 10, information related to a specific area specified by a user operation among a plurality of areas on a map of map data, and, when map data of an emphasized the designated area is generated as illustrated in FIG. 12, the store display area 40b which is not designated by the user is deleted and the store display area 40a which is designated by the user is displayed, so that stores are further narrowed down and the user can easily select a store. Furthermore, areas other than the designated area are not shown, so that the number of drawing objects such as the marks M1 is less, a load on the computer is reduced, a processing speed increases and a memory to use can be saved.

In addition, when a plurality of store display areas 40a and 40b are displayed and one store display area 40a is specified as illustrated in FIG. 10, wherever in the store display area 40a is selected by way of tapping or clicking, the store display area 40a is enlarged and displayed as illustrated in FIG. 12, so that the user can easily specify an area. Further, the display area 40a is enlarged and displayed, so that the user can easily select the mark M1 of each store.

3.2 Modified Example of Display

Next, an operation of displaying a modified example of display of map data will be described using FIGS. 13 to 16.

Figure 13:
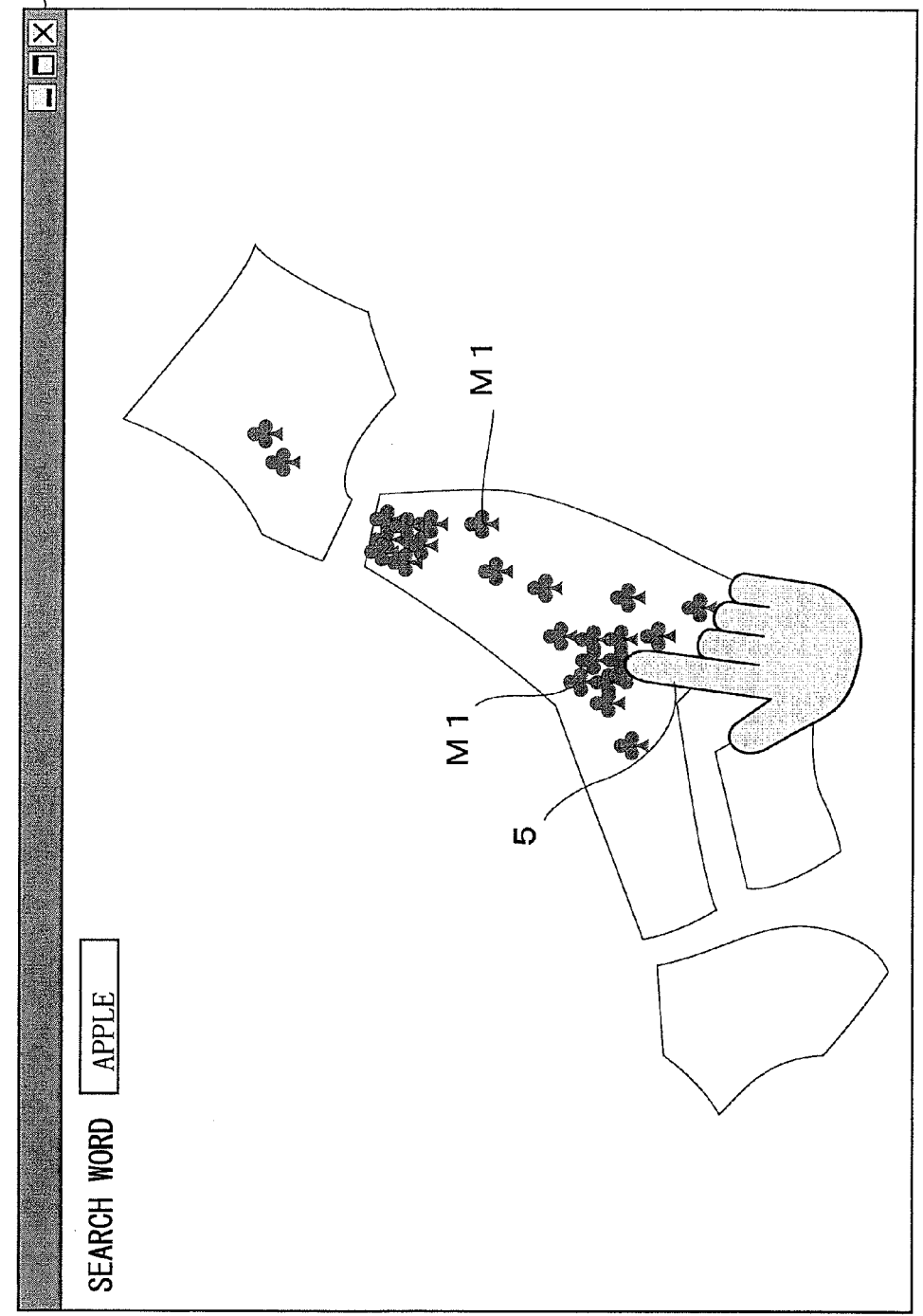
FIG. 13 is a schematic view illustrating a modified example of display of map data generated by the processing in FIG. 9.
Figure 14:
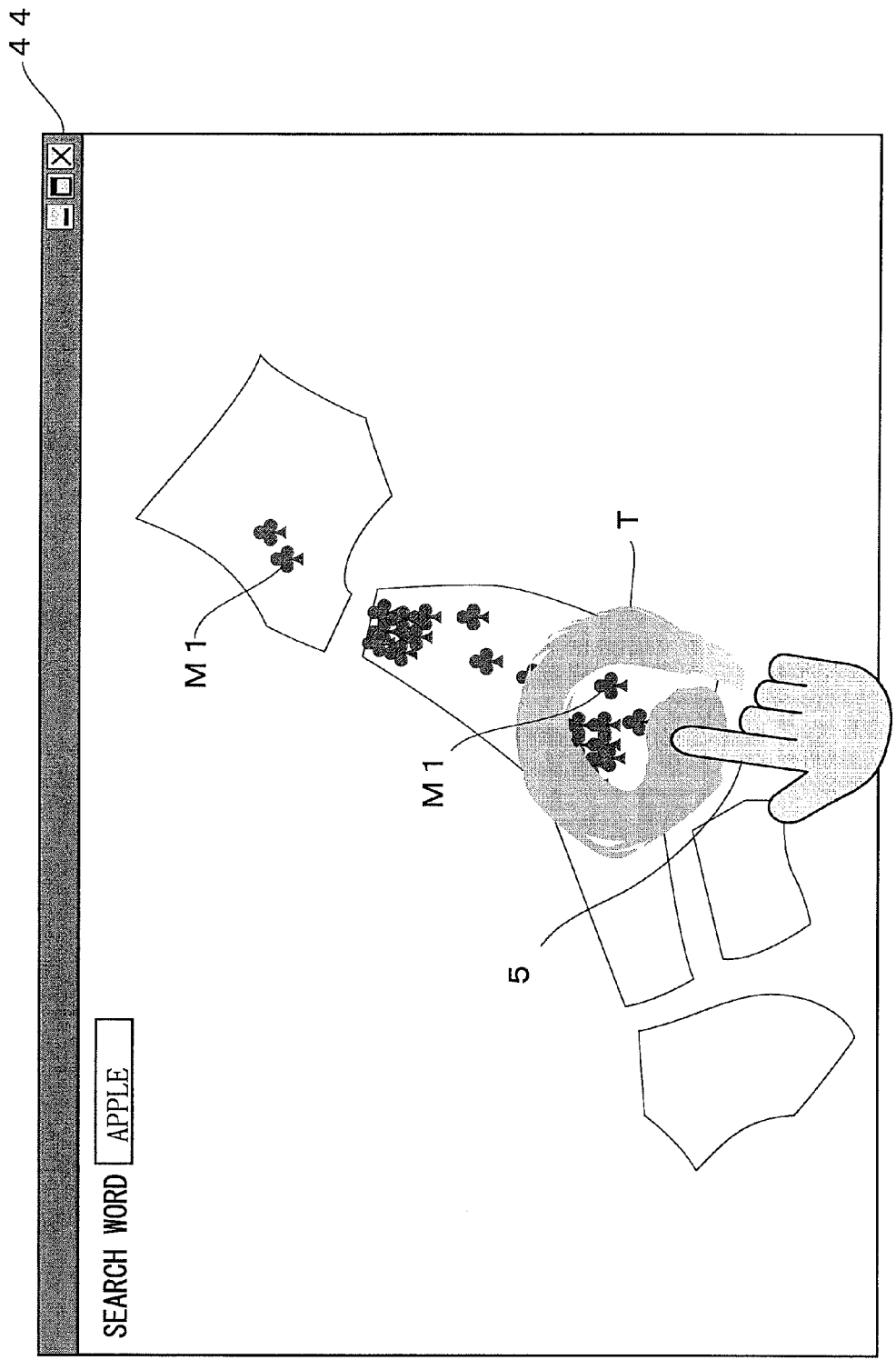
FIG. 14 is a schematic view illustrating an example of a designated area designated by a user in FIG. 13.
Figure 16:
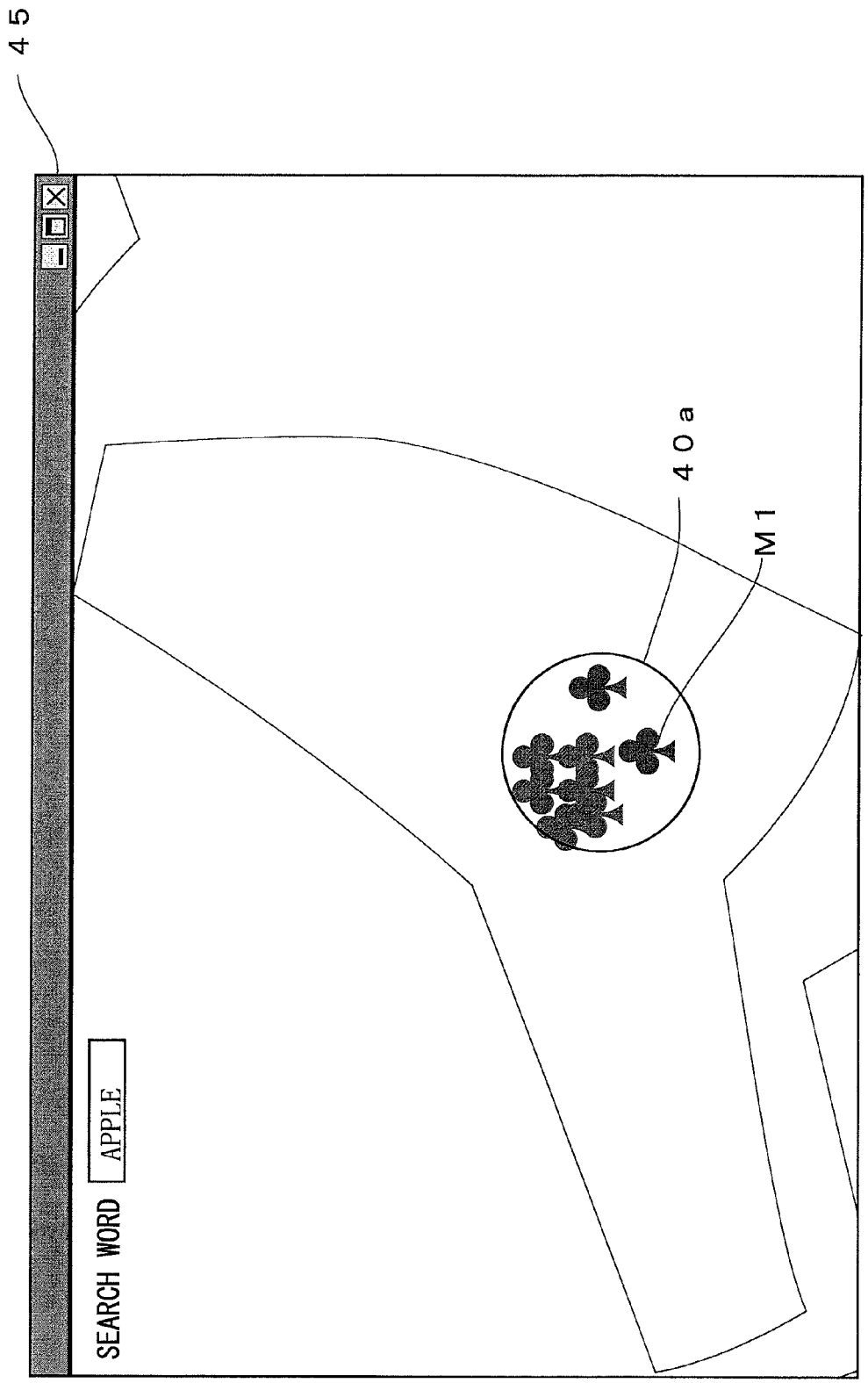
FIG. 16 is a schematic view illustrating an example of display designated by a user in FIG. 14.

FIG. 13 is a schematic view illustrating a modified example of display of map data generated by the processing in FIG. 9. FIG. 14 is a schematic view illustrating an example of a designated area designated by a user in FIG. 13. FIG. 15 is a schematic view illustrating an example of a trajectory for designating a designated area. FIG. 16 is a schematic view illustrating an example of display designated by a user in FIG. 14.

In FIG. 9, processing of the information processing server 10 of finding stores of a predetermined store density or more in step S6 may be skipped. In this case, in step S7, a webpage 43 is generated as illustrated in FIG. 13. In the webpage 43, all stores are displayed on a map of the webpage 43 searched for in step S4. In step S9, the webpage 43 is displayed on the display unit 33.

Further, in step S10, as reception of an input from the user, the information processing server 10 acquires information related to a designated area designated by being encircled by a user operation by way of free-hand on a map of map data.

As illustrated in FIG. 14, the terminal device 30 acquires data of position coordinates of a trajectory T which is traced by being encircled from a position (start point) touched by the finger 5 to a position (end point) at which the finger is separated, on the display unit 33 of the touch panel.

Next, the designated area designated by being encircled will be described using FIG. 15.

As illustrated in FIG. 15, a trajectory T1 of position information extends from a start point Ts1 to an endpoint Te1. Further, when the trajectory T1 has an intersection point at which the trajectory T1 crosses itself between the start point Ts1 and the end point Te1, the trajectory T1 of the position information forms a closed area. As illustrated in FIG. 15, when the trajectory T1 of the position information forms a closed area, the system control unit 14 of the information processing server 10 specifies this closed area as a designated area. That is, an operation of encircling an arbitrary area is performed when a user continuously inputs instructions to the display unit 33 of the touch panel, the system control unit of the information processing server 10 specifies the designated area based on the trajectory T of the position information.

In addition, processing of deciding whether or not a closed area or a designated area is formed based on a continuous trajectory of position information can be realized by, for example, appropriating, for example, a known character recognition technique. The known character recognition technique uses, for example, an open source library which is known to person skilled in art.

Further, even when a closed area is not formed by the trajectory T2 as illustrated in FIG. 15, if the trajectory T2 satisfies predetermined conditions, a designated area may be specified assuming that there is a trajectory of position information between a start point and an end point of the trajectory of position information.

As illustrated in FIG. 15, the trajectory T2 of position information reaches from a start point Ts2 to an end point Te2 without intersecting itself, and the trajectory T2 doesn't form a closed area. Even in this case, when, for example, a distance L between the start point Ts2 and the end point Te2 is a predetermined distance or less or a rate of the distance L between the start point Ts2 and the end point Te2 with respect to the length of the trajectory T2 is a predetermined rate or less, that is, when predetermined conditions are satisfied, the system control unit 14 of the information processing server 10 can specify a designated area assuming that there is a trajectory of position information between the start point TS2 and the end point TE2 of the trajectory T2.

Further, when a gravity point of an area encircled by the trajectory T2 and a line connecting the points Te2 and Ts2 is calculated, and an angle formed by a line connecting the point Te2 and the gravity point and a line connecting the point Ts2 and the gravity point is a predetermined angle or less, the system control unit 14 of the information processing server 10 may specify a designated area assuming that there is a trajectory of position information between the start point Ts2 and the end point Te2 of the trajectory T2.

Furthermore, information related to the designated area designated by being encircled from the position pointed by the pointer by operating the mouse may be acquired.

Next, in step S11, the terminal device 30 transmits data of the position coordinates of the trajectory T or information of the designated area encircled by the trajectory T or, for example, store IDs of stores encircled by the trajectory T as input information to the information processing server 10. In addition, the terminal device 30 may transmit scale size information or longitude/latitude information of a displayed map.

Next, in step S12, the information processing server 10 generates the webpage 45 on which the map is enlarged as illustrated in FIG. 16 and which includes the display area 40*a*, as an example of map data of an emphasized area set by the area setting means by deleting stores in other than the store display area 40*a* based on, for example, the received input information. In addition, the information processing server 10 may set the display area 40*a* in which the trajectory T is an outer rim of the display area 40*a*, or may set the display area 40*a* to include stores encircled by the trajectory T.

Thus, the information processing server 10 functions as an example of a designated area acquiring means which acquires information related to a designated area designated by being encircled by a user operation. Further, the information processing server 10 functions as an example of a map data generating means which maps information indicating stores positioned only in the designated area acquired by the designated area acquiring means, on the map.

Next, in step S13, a processing result is transmitted, and, in step S14, a webpage 45 is displayed on the display unit 33.

When information related to a designated area designated by being encircled by a user operation on the map of map data is acquired as illustrated in FIG. 14, and the map is enlarged and information indicating stores positioned only in the acquired designated area is mapped on the map as illustrated in FIG. 16, stores and facilities are narrowed down only to stores and facilities included in a range encircled on the map, so that it is possible to exclude stores and facilities outside the designated range. Further, an unnecessary portion which is an area other than an area designated by a user as an area which the user wants to see does not need to be shown to the user. Furthermore, it is possible to flexibly select an area, that is, "an area including part of a prefecture A and part of an adjacent prefecture B" which the user wants to see. Still further, the map is enlarged, so that the user can easily select each store.

When the information processing server 10 generates map data of an emphasized set area as illustrated in FIG. 16 such that the store mark M1 in other than the designated area (store display area 40*a*) is deleted and only the store display area 40*a* is displayed, the store display area 40*b* which is not designated by the user is deleted and the store display area 40*a* which is designated by the user is displayed, so that stores are further narrowed down and the user can easily select a store. Further, areas other than the designated area are not shown, so that the number of drawing objects such as the marks M1 is less, a load on the computer is reduced, a processing speed increases and a memory to use can be saved.

In addition, instead of designating a designated area by being encircled by a user operation as illustrated in FIG. 13, a designated area may be designated by tapping by the finger 5 a site at which stores gather on the map. In step S10, when receiving an input from the user, the terminal device 30 acquires the position tapped by the finger 5 on the display unit 33. Further, the information processing server 10 generates a webpage including a store display area 41*a* in a predetermined radius around the position tapped by the finger 5 like the webpage 45 in FIG. 16. Thus, a distribution of stores on a map is displayed, so that the user can comprehend where there are more pieces of information, and can easily select information.

3.3 Modified Example of Operation of Information Processing System

Next, a modified example of an operation of the information processing system will be described using FIGS. 17 and 18.

Figure 17:
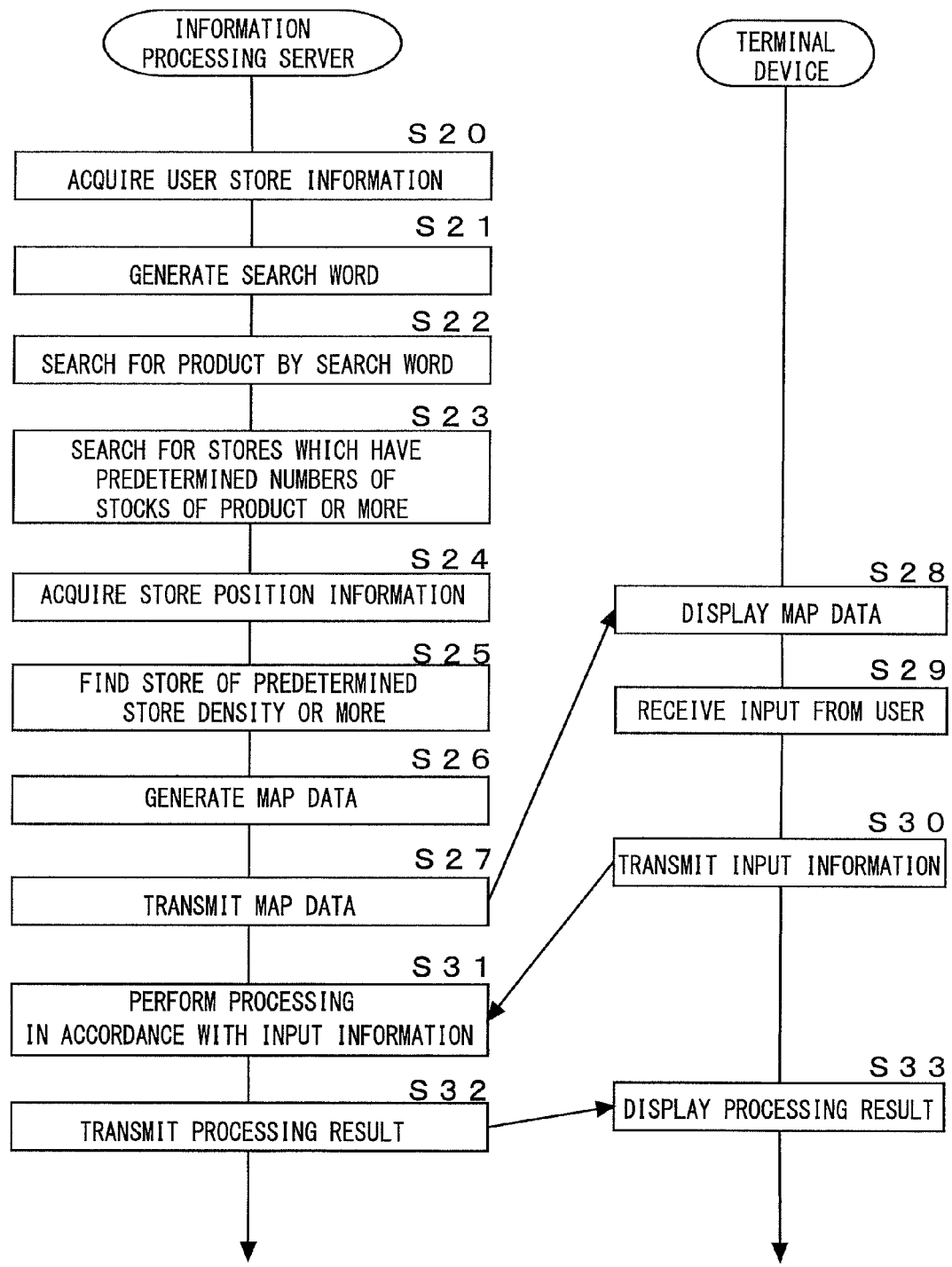
FIG. 17 is a sequence diagram illustrating a modified example of an operation of the information processing server in FIG. 1.
Figure 18:
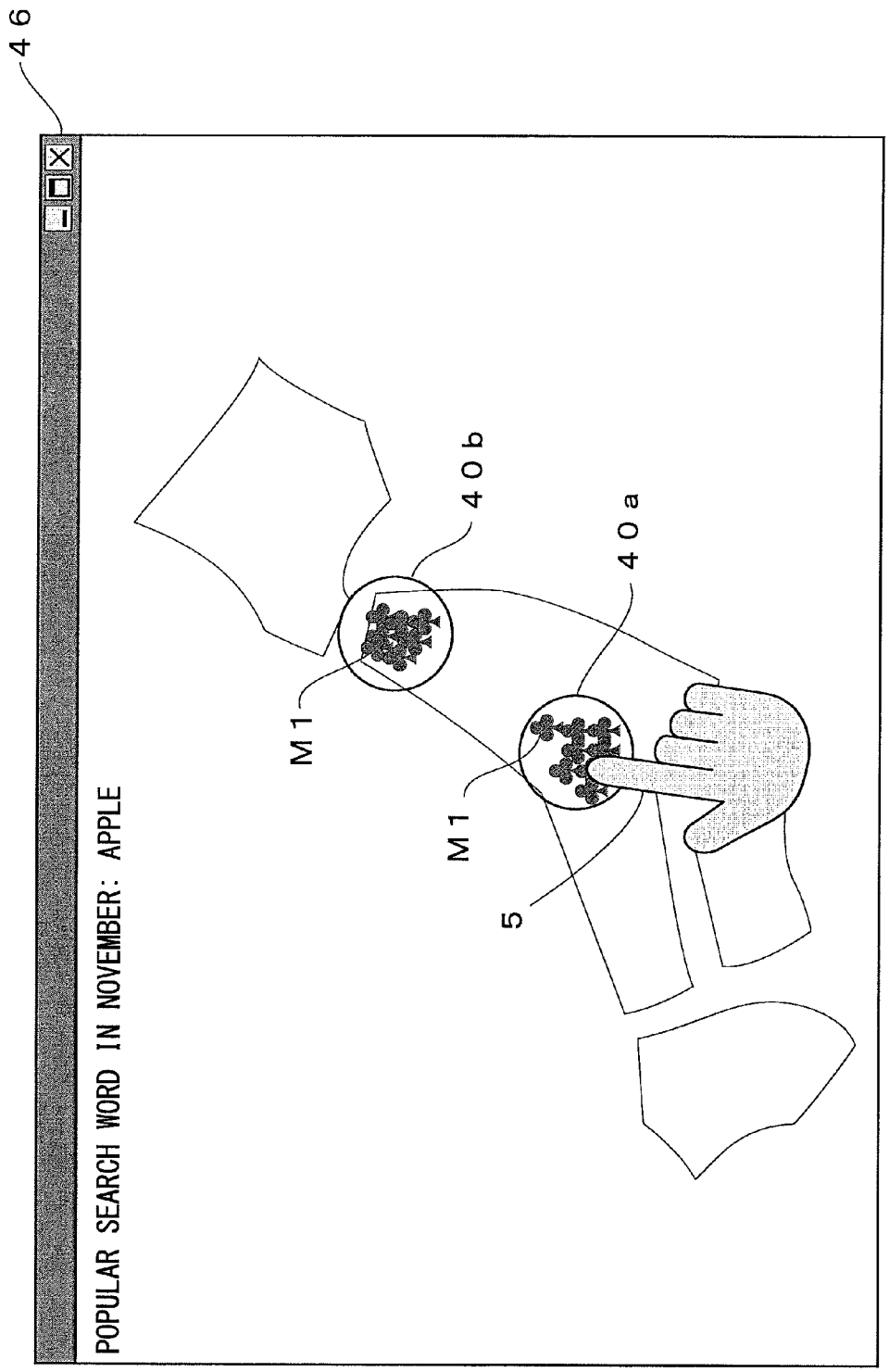
FIG. 18 is a schematic view illustrating an example of display of map data generated by processing in FIG. 17.

FIG. 17 is a sequence diagram illustrating a modified example of an operation of the information processing server 10. FIG. 18 is a schematic view illustrating an example of display of map data generated by processing in FIG. 17.

As illustrated in FIG. 17, the information processing server 10 acquires user store information (step S20). More specifically, the system control unit 14 of the information processing server 10 refers to the product/service DB 12*a*, and acquires information tweeted on, for example, products of stores by various users or a search word which is highly frequently by users at the shopping site operated by the information processing server 10 as an example of user store information about stores from users. Further, the information processing server 10 may acquire information about a current location measured by a GPS from the terminal device 30 of the user as an example of user store information to search for stores near the current location of the user. Furthermore, users' voting results for, for example, products handled by stores may be used as an example of user store information.

Next, the information processing server 10 generates a search word (step S21). More specifically, the system control unit 14 of the information processing server 10 analyzes a structure of information tweeted on a product of a store, and generates a word of a high frequency or a word extracted using, for example, tf-idf (term frequency-inverse document frequency) as a search word. Further, when a search word which is frequently used at a shopping site is acquired, the search word is used as a generated search word. Furthermore, a search word which is highly frequently used in an area may be acquired from current information of the terminal device 30 referring to the product/service DB 12a, and the search word may be used as a generated search word. Still further, shortened URL information included in information tweeted on a product of a store may be acquired as a search word.

The information processing server 10 searches for a product by the search word (step S22). The same processing as in step S3 is performed. In addition, in case of the shortened URL information, for example, a product indicated by the URL is found.

Further, in step S23 to step S33, the information processing server 10 and the terminal device 30 perform the same processings as in step S4 to step S14. As illustrated in FIG. 18, a webpage 46 is displayed on the display unit 33.

Thus, when position information is searched for in accordance with user store information from users about stores which have predetermined numbers of stocks of products searched for from an acquired search word, it is possible to present an area of stores corresponding to a search word which is frequently used and an area of currently popular stores or stores of interest, so that the users can select an area or a store. Further, it is possible to comprehend in which area search words input by various users are recently tweeted frequently on a map, so that, even when users do not known which area on the map is popular, the users can easily select a store or a facility included in a popular area. Furthermore, precision to narrow down stores is improved in accordance with user store information.

Second Embodiment

4. Outline of Configuration and Function of Information Processing System 4.1 Configuration and Function Next, an information processing system according to a second embodiment of the present invention will be described using FIGS. 19 to 24. In addition, a configuration of the information processing system according to the present embodiment is the same as in an information processing system according to the first embodiment, and the same or corresponding portions as in the first embodiment will be assigned the same reference numerals to describe, for example, configurations. The same applies to the other embodiments and modified examples.

In addition, in the present embodiment, services provided by stores are extended.

4.1 Configurations of Product/Service DB 12a and Store DB 12b

Only differences of configurations of a product/service DB 12a and a store DB 12b from the first embodiment will be described using FIGS. 19 to 21.

In the product/service DB 12a, for example, product names are stored in association with product/service IDs which are identifiers for identifying products and services instead of product IDs.

Further, as illustrated in FIG. 19, in the product/service DB 12a, search words are stored in association with product IDs. For example, products/services related to search words such as an apple of a given production area associated with a product/service ID "01234567", an "apple juice" associated with a product/service ID "01234568" and apple picking service associated with a product/service ID "0051234568" are stored for a search word "apple". The products/services related to search words such as service for a certain type of massage associated with a product/service ID "0070234567", service for another type of massage associated with a product/service ID "0070234568" and a product of a massage tool associated with a product/service "0001234568" are stored for a search word "massage".

Further, in the store DB 12b, as illustrated in FIG. 20, store IDs of stores which provide products or services, and product/service IDs of products/services provided by stores are associated and stored. Furthermore, as illustrated in FIG. 21, in the store DB 12b, for example, the numbers of available services are stored in association with products/service IDs of services provided by stores per store ID based on availability information of service such as an status of availability of service, waiting information and a usable status of a facility in each service transmitted from each store terminal device 20 of a store which provides service.

4.2 Operation of Information Processing Server According to Second Embodiment

Figure 23:
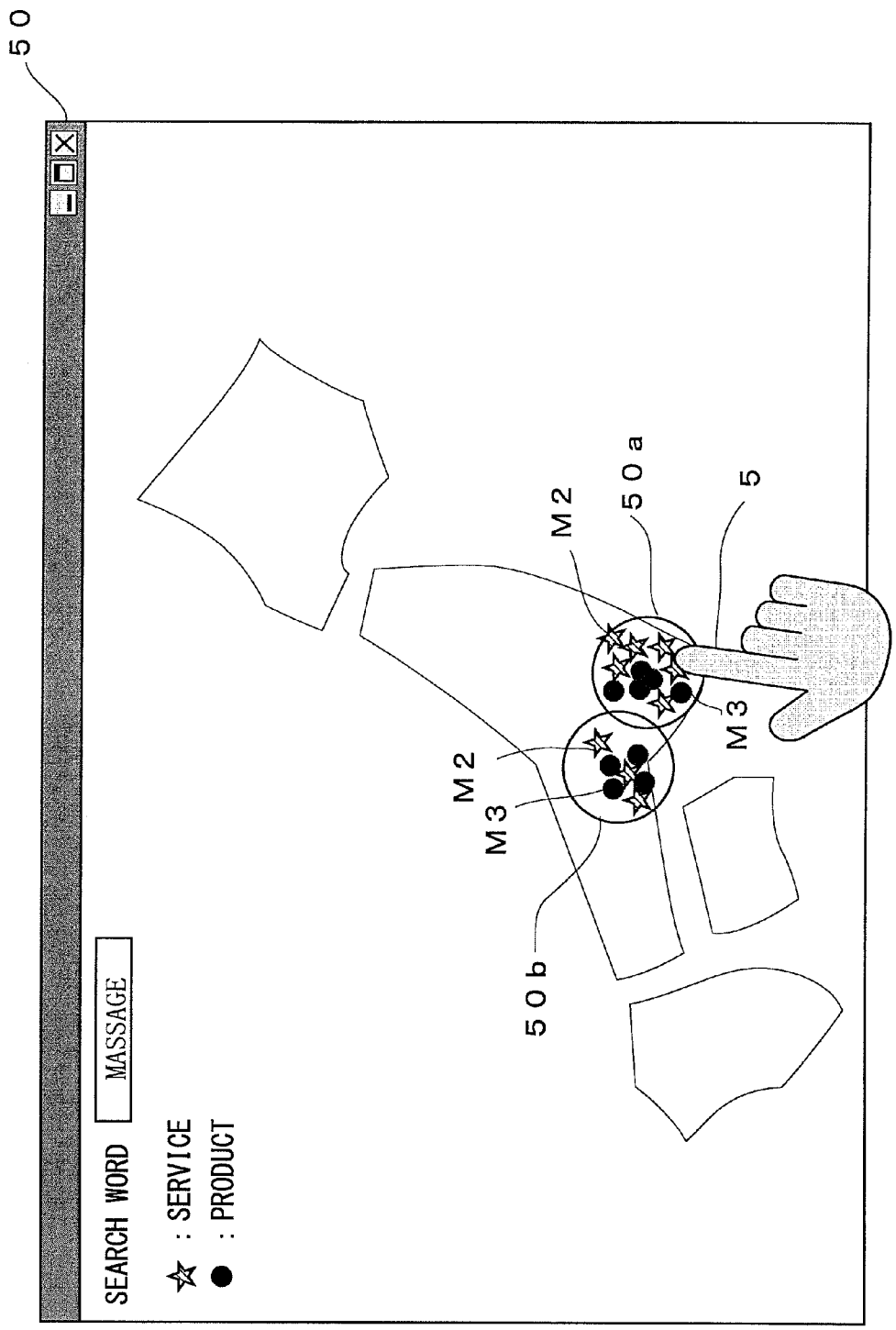
FIG. 23 is a schematic view illustrating an example of display of map data generated by processing in FIG. 22.
Figure 24:
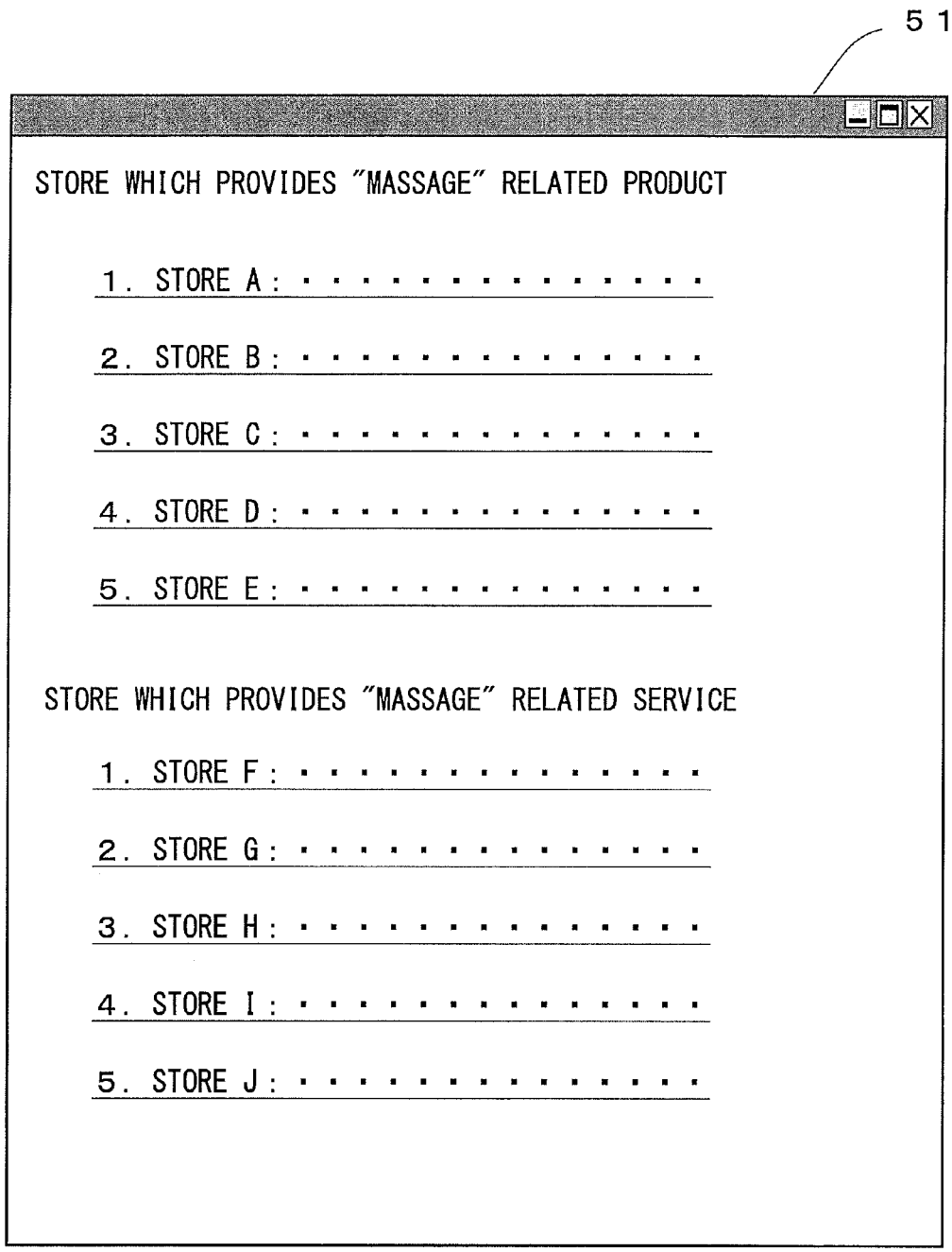
FIG. 24 is a schematic view illustrating an example of display designated by a user in FIG. 23.

Next, an operation of an information processing system 1 according to the second embodiment of the present invention will be described using FIGS. 22 to 24. In addition, an operation of the information processing system according to the present embodiment is the same operation as in the information processing system according to the first embodiment, and the same or corresponding portions as in the first embodiment will be assigned the same reference numerals to describe, for example, operations. The same applies to the other embodiments and modified examples.

Figure 22:
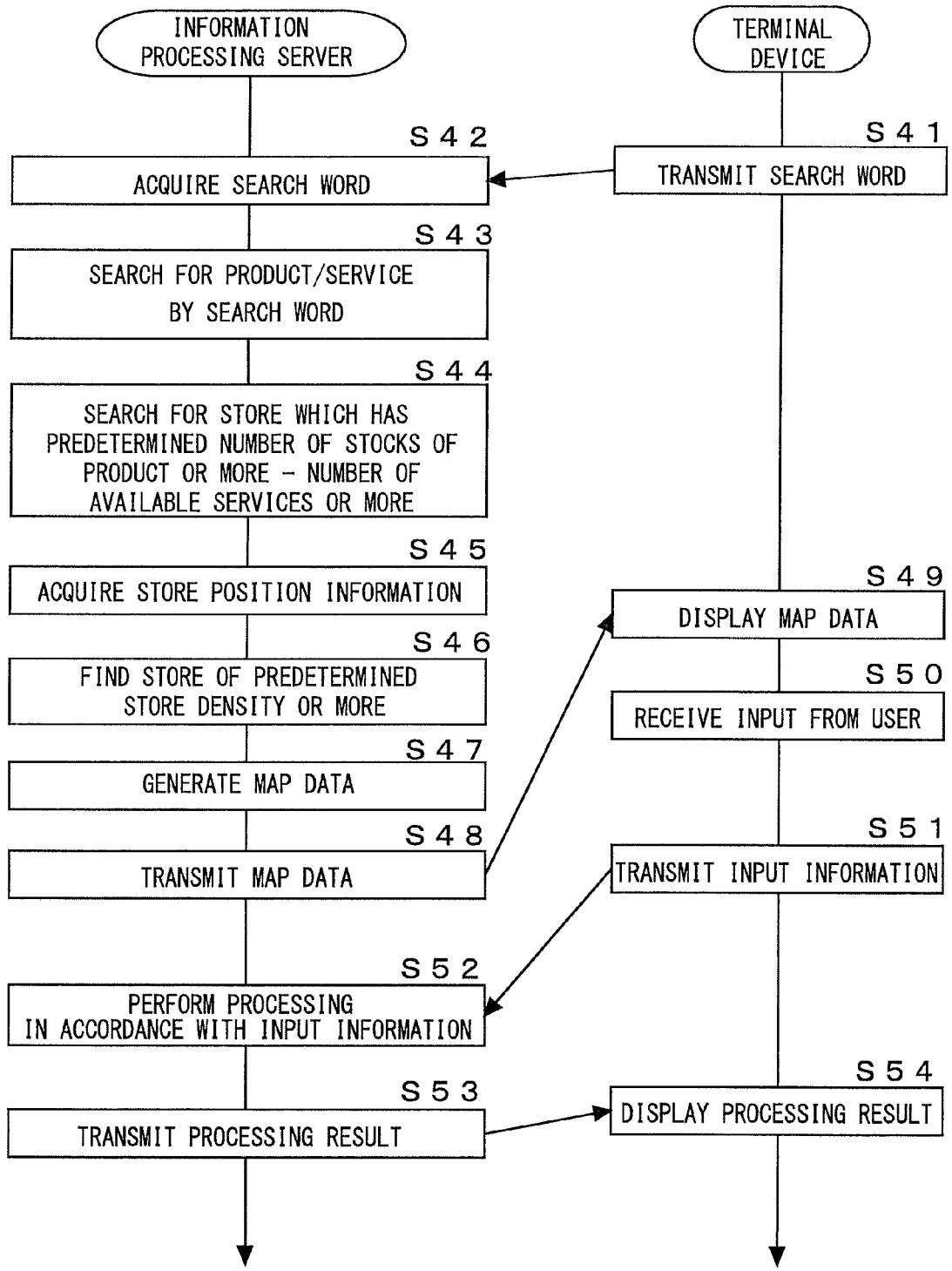
FIG. 22 is a sequence diagram illustrating an example of an operation of the information processing server in FIG. 1 according to the second embodiment.

FIG. 22 is a sequence diagram illustrating an example of an operation of the information processing server according to the second embodiment. FIG. 23 is a schematic view illustrating an example of display of map data generated by processing in FIG. 22. FIG. 24 is a schematic view illustrating an example of display designated by a user in FIG. 23.

As illustrated in FIG. 22, a terminal device 30 transmits a search word as in step S1 (step S41). A user who is searching for a product inputs a search word (an example of a search word related to a product or service) such as "massage" in a webpage for product search displayed on a display unit 33 of the terminal device 30. When a search button of this webpage is clicked or tapped, a system control unit 36 of the terminal device 30 transmits the search word to an information processing server 10.

Next, the information processing server 10 acquires the search word from the terminal device 30 as in step S2 (step S42). Thus, the information processing server 10 functions as an example of a search word acquiring means which acquires the search word related to the product or the service.

Next, the information processing server 10 searches for a product or service by the search word as in step S3 (step S43). More specifically, as illustrated in FIG. 19, a system control unit 14 of the information processing server 10 refers to the product/service DB 12*a* which stores data of the correspondence between search words and products, searches for a product and service by the acquired search word and finds a product/service ID corresponding to the search word.

Next, the information processing server 10 searches for stores which has a predetermined number of stocks of products or more, or the number of available services or more as in step S4 (step S44). More specifically, as illustrated in FIG. 20, the system control unit 14 of the information processing server refers to the store DB 12*b* which stores data of the correspondence between stores and products/services provided by the stores, searches for stores corresponding to respective found product/service IDs, and finds store IDs corresponding to the product/service IDs. Further, as illustrated in FIG. 21, the system control unit 14 of the information processing server 10 refers to the store DB 12*b* which stores data of the correspondence between the numbers of stocks of products at a store and the number of available services, and finds the numbers of stocks of products or the number of available services (an example of the number of available services) of each store corresponding to the found store IDs and product/service IDs. When the found numbers of stocks or numbers of availability is a predetermined number or more, the system control unit 14 of the information processing server 10 obtains stores which have a predetermined number of stocks of a product or more, or the number of available services or more as a store search result.

Next, the information processing server 10 acquires position information of a store as in step S5 (step S45). More specifically, as illustrated in FIG. 5, the system control unit 14 of the information processing server 10 refers to the store DB 12*b* which stores data of the correspondence between stores and position information of the stores, and acquires position information of stores such as addresses or longitude/latitude corresponding to store IDs of stores which have a predetermined number of stocks of a product or more corresponding to a search word or a predetermined number of available services or more corresponding to the search word.

Next, the information processing server 10 finds a store of a predetermined store density or more as in step S6 (step S46).

Next, the information processing server 10 generates map data as in step S7 (step S47). More specifically, as illustrated in FIG. 23, the system control unit 14 of the information processing server 10 generates a webpage 50 of a HTML format which includes display areas 50*a* and 50*b* (examples of areas of a predetermined store density or more) of stores in which stores of a predetermined store density or more are displayed. In the display areas 50*a* and 50*b* of the webpage 50, the stores of the predetermined store density or more are mapped on positions on a map in accordance with position information of the stores as indicated by marks M2 indicating stores which provide services (an example of information related to stores) and marks M3 indicating stores which provide products (an example of information related to stores).

Next, the information processing server 10 transmits the map data as in step S8 (step S48).

Next, the terminal device 30 displays the map data as in step S9 (step S49). More specifically, the system control unit 36 of the terminal device 30 has the display unit 33 display the webpage 50 as illustrated in FIG. 23, based on the information of the webpage 50 received from the information processing server 10.

Next, the terminal device 30 receives an input from the user as in step S10 (step S50). When the store display area 50*a* on the display unit 33 is tapped by a finger 5 of the user as illustrated in FIG. 23, the system control unit 36 of the terminal device 30 acquires information about coordinates of a position tapped on the display unit 33.

Next, the terminal device 30 transmits input information as in step S11 (step S51). The system control unit 36 of the terminal device 30 decides whether or not the tapped position coordinates on the display unit 33 are in the store display area 50*a*, and, when the position coordinates are in the store display area 50*a*, transmits input information that the display area 50*a* is instructed, to the information processing server 10.

Next, the information processing server 10 performs processing in accordance with input information as in step S12 (step S52). More specifically, the system control unit 14 of the information processing server 10 receives the input information that the display area 50*a* is instructed, and generates a webpage 51 of a list of stores in the display area 50*a* as illustrated in FIG. 24. In the webpage 51, stores which provide products and stores which provide services displayed separately. In addition, as illustrated in FIG. 12 according to the first embodiment, the system control unit 14 of the information processing server 10 may generate a webpage of map data of an enlarged vicinity of the display area 50*a* to emphasize.

Next, the information processing server 10 transmits a processing result as in step S13 (step S53).

Next, the terminal device 30 displays a processing result as in step S14 (step S54).

Further, when a webpage of enlarged map data as illustrated in FIG. 12 is displayed, the step may return to step S50 and the terminal device 30 may receive an input from the user.

Thus, the information processing server 10 functions as an example of a position information searching means of referring to a memory means which stores position information of stores which provide products or services, or stock information of products which the stores have or services and information about service availability provided by the stores, and searches for position information of stores which have a predetermined number of stocks of products or a predetermined number of available services.

As described above, according to the present embodiment, by acquiring a search word related to a product or service, referring to the store DB 12*b* (an example of a memory means) which stores position information of stores which provide products or services and stock information of products which the stores have or information about service availability provided by the store, and searching for position information of stores which have a predetermined number of stocks of products or a predetermined number of available services, generating the webpage 50 (map data) of a map on which marks M1 (an example of information indicating stores) are mapped in accordance with the searched position information of the stores, and outputting the map data, it is possible to display on the map a distribution of stores which handle a search target product at a point of time when the product is searched for. Further, the second embodiment provides the same effect as the first embodiment (the same applies to the following modified example).

4.3 Modified Example of Display according to Second Embodiment

Next, an operation of displaying a modified example of display of map data will be described using FIGS. 25 to 27.

Figure 25:
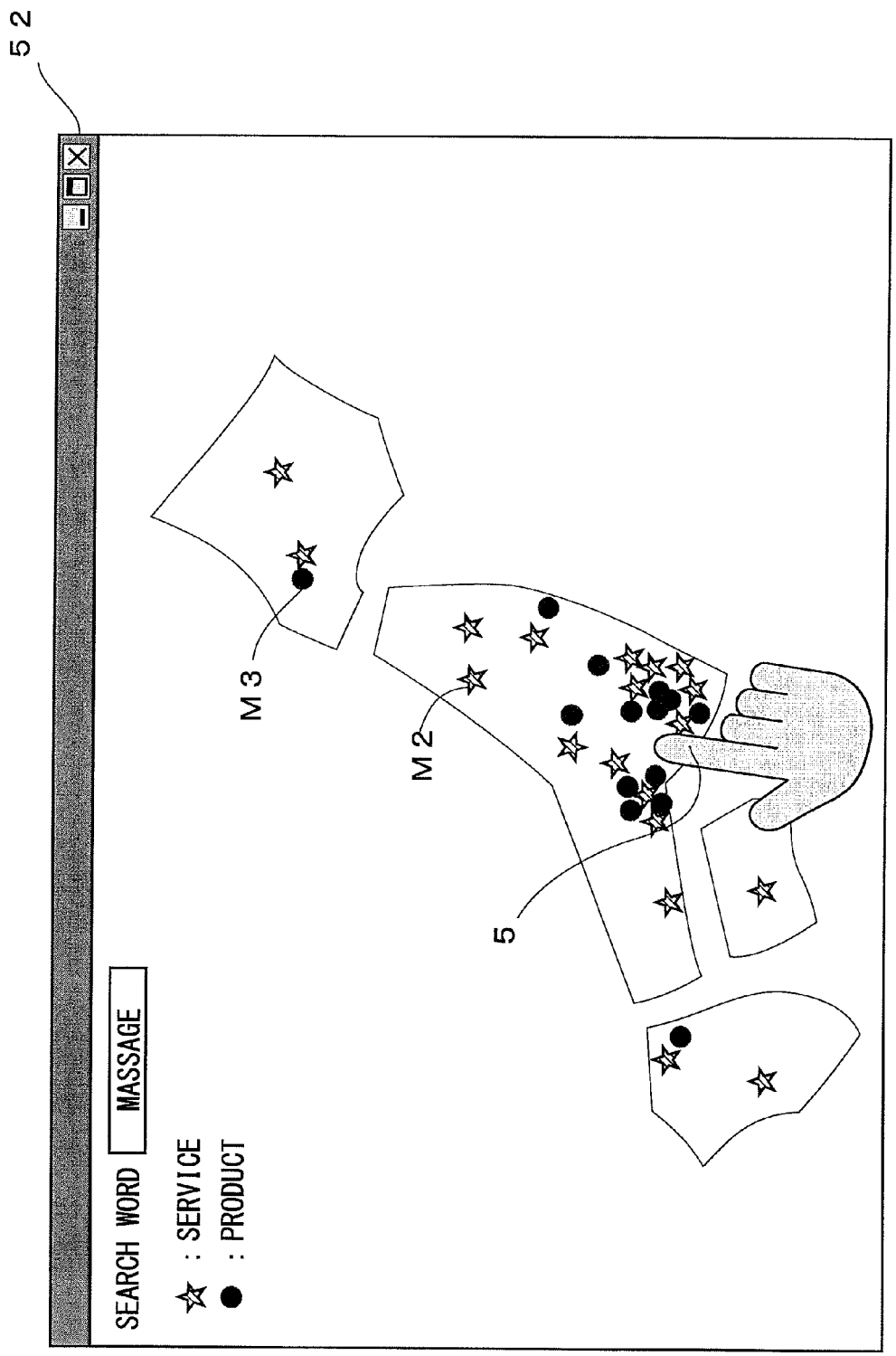
FIG. 25 is a schematic view illustrating a modified example of display of map data generated by the processing in FIG. 22.
Figure 26:
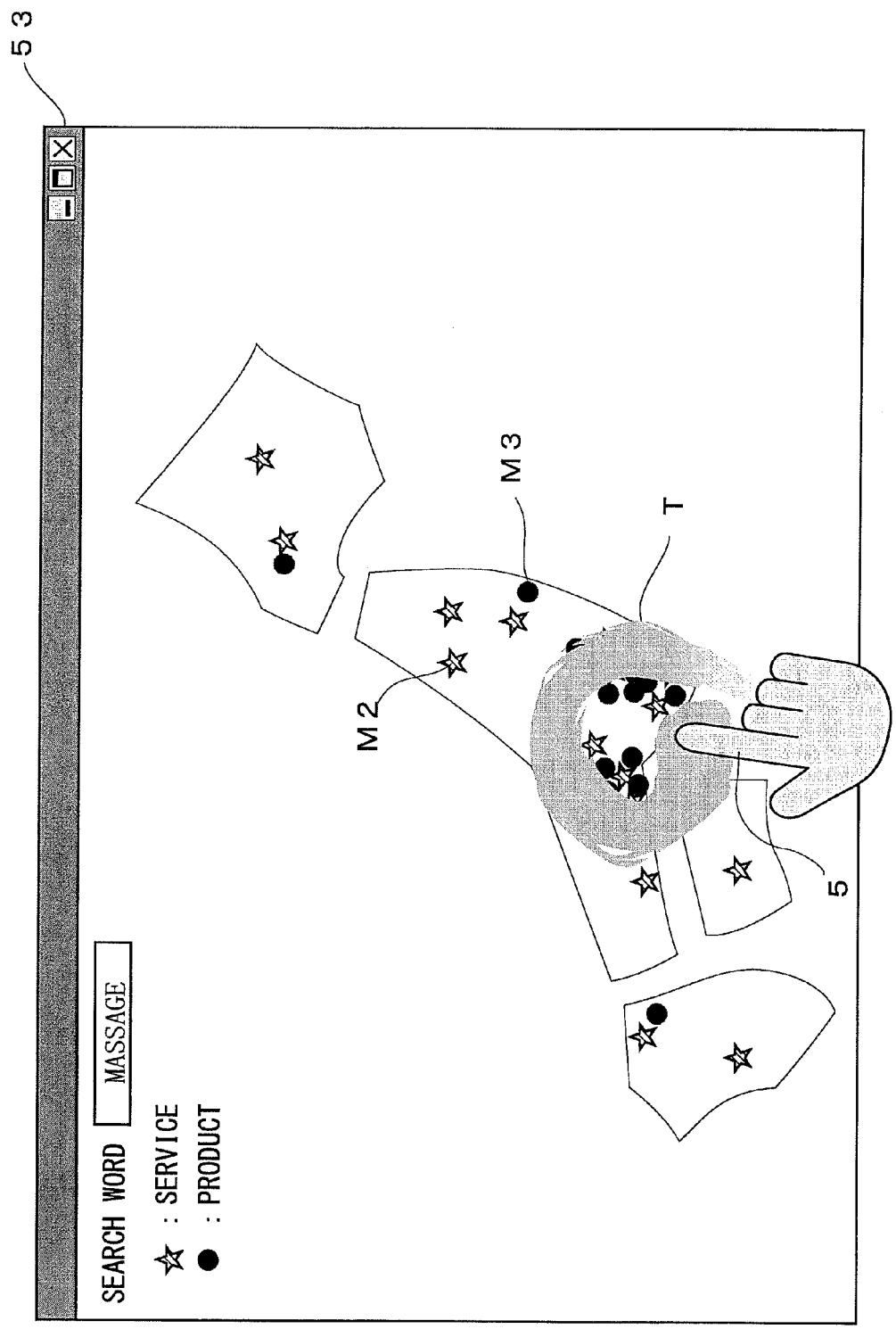
FIG. 26 is a schematic view illustrating an example of a designated area designated by a user in FIG. 25.

FIG. 25 is a schematic view illustrating a modified example of display of map data generated by the processing in FIG. 22. FIG. 26 is a schematic view illustrating an example of a designated area designated by a user in FIG. 25. FIG. 27 is a schematic view illustrating an example of display designated by a user in FIG. 26.

Similar to the operation according to the first embodiment, processing of the information processing server 10 of finding stores of a predetermined density or more in step S46 may be skipped. In this case, in step S47, a webpage 52 is generated as illustrated in FIG. 25. In the webpage 52, all stores on a map of the webpage 52 searched for in step S44 are displayed. In step S49, the webpage 52 is displayed on the display unit 33.

Further, in step S50, as reception of an input from the user, the information processing server 10 acquires information related to a designated area designated by being encircled by a user operation by way of free-hand on a map of map data. As illustrated in FIG. 26, the terminal device 30 acquires data of position coordinates of a trajectory T which is traced by being encircled from a position (start point) touched by the finger 5 to a position (end point) at which the finger is separated, on the display unit 33 of the touch panel.

Next, in step S51, the terminal device 30 transmits data of the position coordinates of the trajectory T or information of the designated area encircled by the trajectory T or, for example, store IDs of stores encircled by the trajectory T as input information to the information processing server 10.

Figure 27:
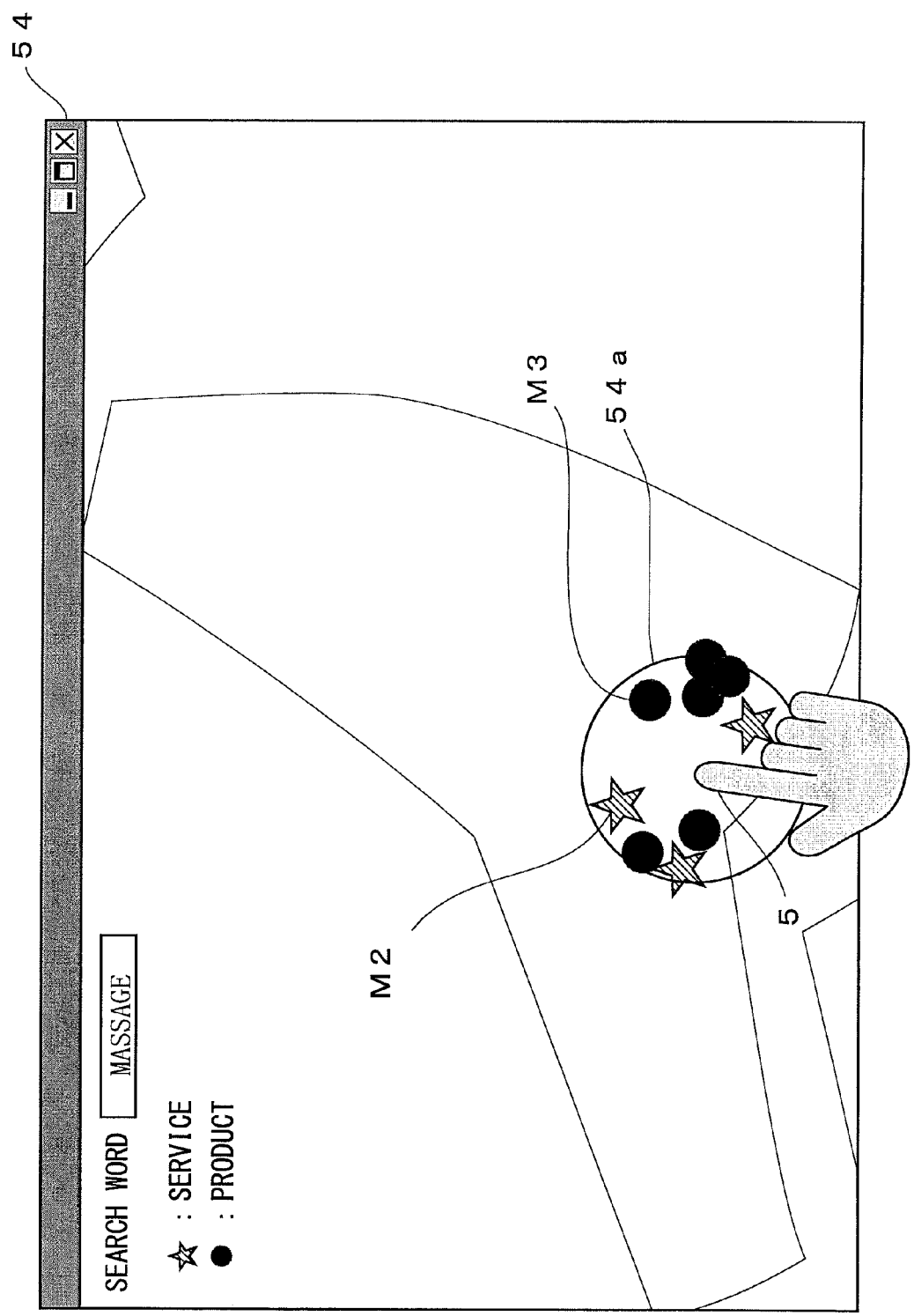
FIG. 27 is a schematic view illustrating an example of display designated by a user in FIG. 26.

Next, as illustrated in FIG. 27, in step S52, the information processing server 10 generates the webpage 54 on which the map is enlarged and which includes a display area 54a, as an example of map data of an emphasized area set by the area setting means by deleting stores in other than the store display area 50a based on, for example, the input information. Thus, the information processing server 10 generates map data of the emphasized set area such that the marks M2 and M3 other than in the designated area (store display area 54a) are deleted and only the store display area 54a is displayed.

Next, in step S53, a processing result is transmitted, and, in step S54, a webpage 54 is displayed on the display unit 33.

In addition, as illustrated in FIG. 25, instead of designating a designated area by being encircled by a user operation, a designated area may be designated by tapping by the finger 5 a predetermined position looking at how stores are distributed on the map. In step S50, when receiving an input from the user, the terminal device 30 acquires the position tapped by the finger 5 on the display unit 33. Further, the information processing server 10 generates a webpage including a store display area 54a in a predetermined radius around the position tapped by the finger 5 like the webpage 54 in FIG. 27. Thus, a distribution of stores on a map is displayed, so that the user can comprehend positions of stores on the map, and can easily select information.

4.4 Modified Example of Specification by User

Next, a modified example of specification by a user according to the first and second embodiments will be described using FIGS. 28 and 30. In addition, a case of service according to the second embodiment will be described with the present modified example.

Figure 28:
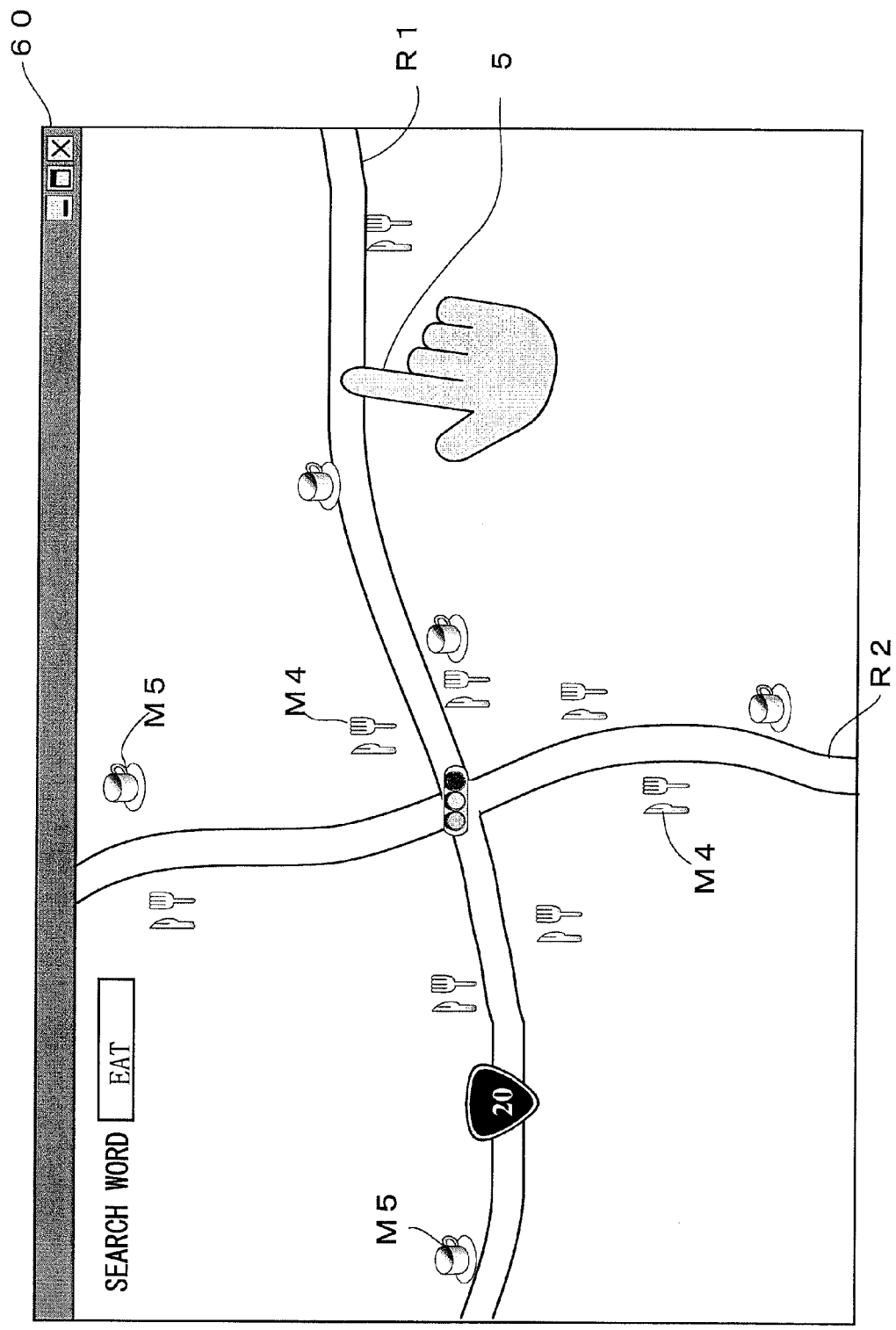
FIG. 28 is a schematic view illustrating a modified example of display of map data generated by the information processing server in FIG. 1.
Figure 29:
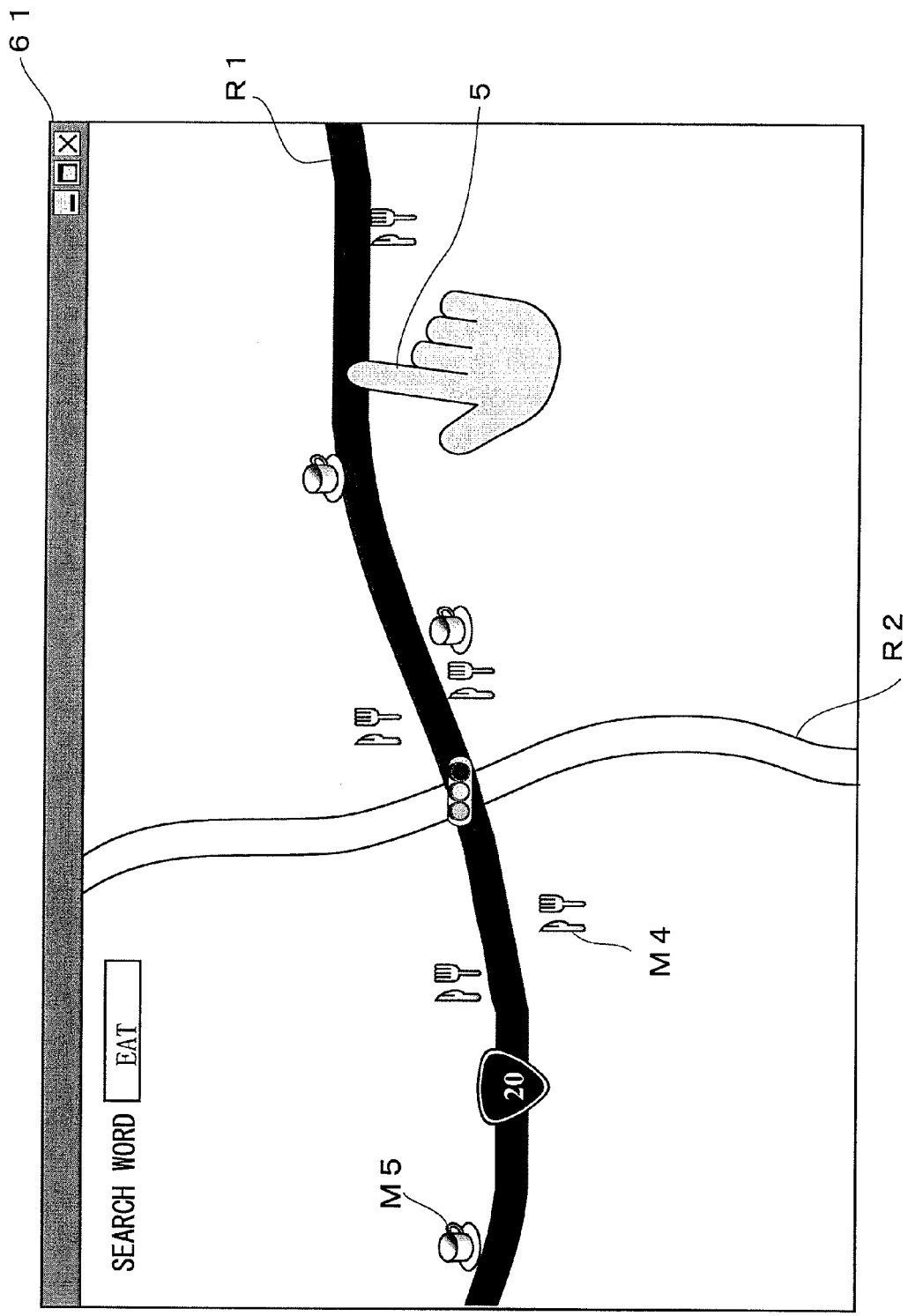
FIG. 29 is a schematic view illustrating an example of display designated by a user in FIG. 28.

FIG. 28 is a schematic view illustrating a modified example of display of map data generated by the information processing server 1. FIGS. 29 and 30 are schematic views illustrating examples of display designated by a user in FIG. 28.

For example, in step S41 (step S1), a search word "eat" is transmitted and, in step S43 to step S46 (step S46 may be skipped), stores corresponding to the search word "eat" are searched for. Further, in step S47 (step S7), the information processing server 10 generates a webpage 60 which is an example of map data of a map on which information indicating stores is mapped as illustrated in FIG. 28. Furthermore, the terminal device 30 displays the webpage 60 on the display unit 33. In the webpage 60, roads R1 and R2 which are examples of roads, and marks M4 and M5 indicating stores which provide products or services related to the search word "eat" (an example of information related to stores) are displayed. In addition, roads may be railroads, drives, pavements, mountain tracks or routes in addition to roads.

In step S50, when the road R1 on the display unit 33 is tapped (designated) by the finger 5 of the user as illustrated in FIG. 28, the terminal device 30 acquires information about coordinates of a position tapped on the display unit 33. The terminal device 30 transmits input information that the road R1 is tapped, to the information processing server 10. In addition, information that the road R1 is tapped as input information may be transmitted to the information processing server 10 instead of position information.

Next, in step S52, the information processing server 10 specifies a road on the map of the map data corresponding to information related to the acquired designated position based on, for example, the received input information. Further, the information processing server 10 sets stores within a predetermined width from the specified road, and, as illustrated in FIG. 29, generates map data of the map on which information indicating only stores within a predetermined width (an example of a store display area) from the specified road R1 among the stores mapped on the map. Meanwhile, as illustrated in FIG. 29, the road R1 is painted as a road to emphasize the specified road. In addition, stores within a predetermined width may be, for example, stores which is in several fold of a width of the road or stores which are associated with the specified road in advance. Further, the predetermined width may be set based on scale size information of the map.

Thus, the information processing server 10 functions as an example of a designated position acquiring means which acquires information related to a position designated by a user operation on the map of map data. Further, the information processing server 10 functions as an example of a road specifying means which specifies a road on the map of the map data corresponding to information related to the designated position acquired by the designated position acquiring means. Furthermore, the information processing server 10 functions as an example of a map data generating means which generates map data of a map on which information indicating only stores within a predetermined width from the road specified by the road specifying means among stores mapped on the map is mapped.

Next, the information processing server 10 transmits a processing result in step S53.

Next, the terminal device 30 displays a processing result in step S54 as illustrated in FIG. 29. When the marks M4 and M5 are designated by the user, information related to stores indicated by these marks are displayed on the display unit 33.

Thus, when information related to a position (road R1) designated by a user operation on a map of map data is acquired, the road (road R1) on the map of the map data corresponding to the information related to the acquired designated position is specified, and the map data (webpage 61) of the map on which information indicating only stores within a predetermined width from the specified road among the stores mapped on the map is generated, stores related to the road R2 are deleted and only stores related to the road R1 are displayed, so that the user can easily focus on an area which the user is looking for and find a store. Further, areas other than the designated area are not shown, so that the number of drawing objects such as the marks M4 and M5 is less, a load on the computer is reduced, a processing speed increases and a memory to use can be saved.

Figure 30:
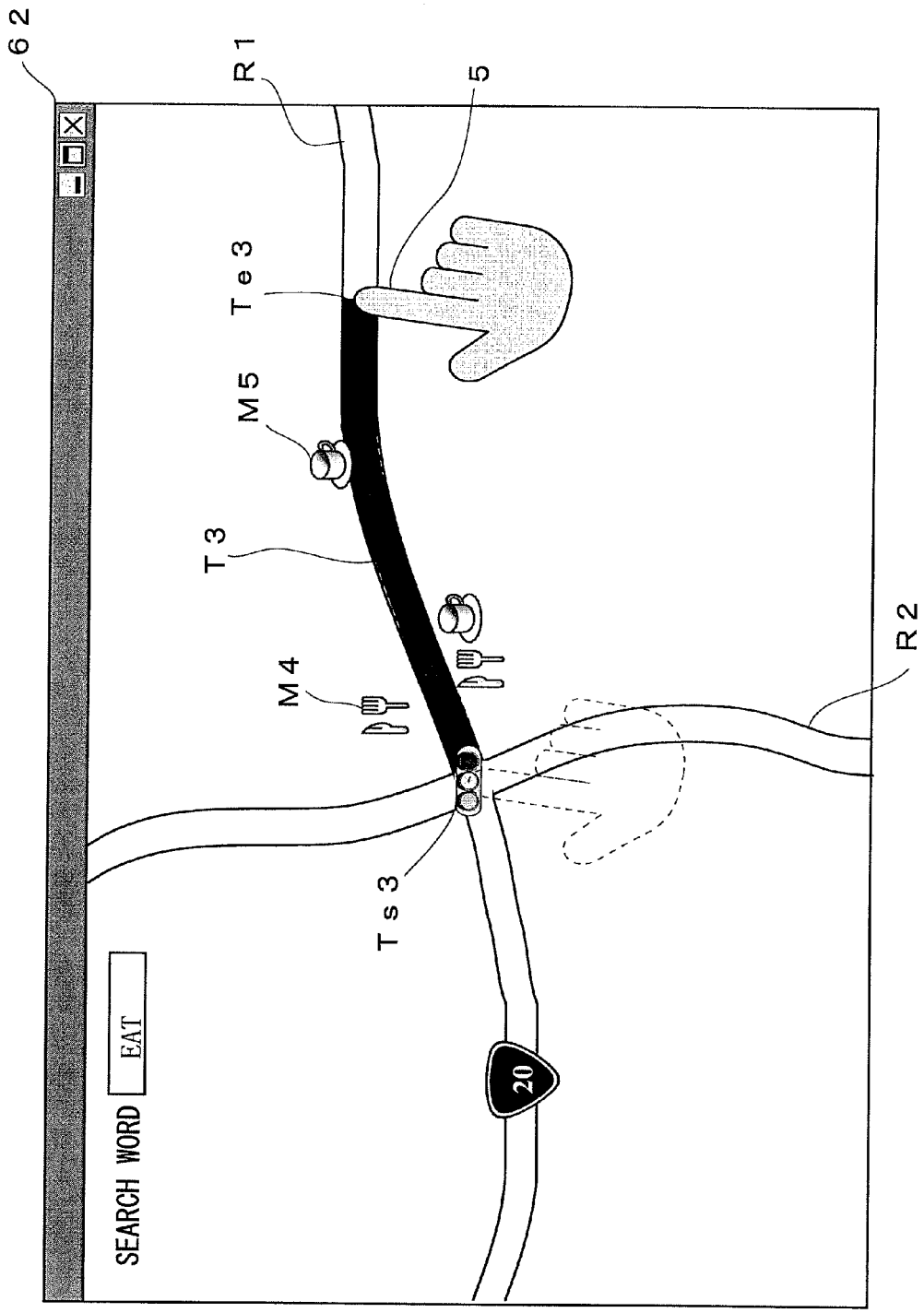
FIG. 30 is a schematic view illustrating an example of display designated by a user in FIG. 28.

In addition, as illustrated in FIG. 30, a trajectory T3 may be designated by the user by being traced from a point Ts3 on the road R1 on the map displayed on the display unit 33 of the touch panel to a point Te3 on the road R1 along the road R1. When the tracing finger 5 is separated from the display unit 33 of the touch panel, the terminal device 30 acquires position information of the traced trajectory (trajectory traced according to a continuous input of instructions) T3. Further, the terminal device 30 transmits position information of the trajectory T3 as input information, to the information processing server 10.

Next, the information processing server 10 functions as a trajectory position acquiring means which acquires position related to the position of the trajectory traced by a user operation to receive position information of the trajectory T3. Further, the information processing server 10 sets stores within a predetermined width from the trajectory T3 based on, for example, received input information, and, as illustrated in FIG. 30, generates map data (webpage 62) of the map on which information indicating only stores within a predetermined width (an example of a store display area) from the trajectory T3 among the stores mapped on the map is mapped. Meanwhile, as illustrated in FIG. 30, the road R1 corresponding to the trajectory T3 is painted as a road to emphasize the road of the designated trajectory.

In addition, the trajectory T3 may not be traced along the road, and stores to display may be set from an arbitrary trajectory on the map. For example, in FIG. 13 or 25, the information processing server 10 may set stores within a predetermined width from a trajectory traced on the map, and generate map data of a map on which information indicating only stores within a predetermined width from this trajectory is mapped. Thus, when the map does not include position information indicating roads or when the map does not include position information indicating narrow roads even though the map includes position information indicating main streets, it is possible to easily designate stores in a vicinity which the user is looking for and search for a store.

Further, the present invention is by no means limited to the above embodiments. The above embodiments are exemplary embodiments, and all embodiments are included in a technical scope of the present invention as long as the embodiments employ substantially the same configurations as a technical idea recited in the claims of the present invention and provide the same function and effect.

EXPLANATION OF REFERENCE NUMERALS

1: INFORMATION PROCESSING SYSTEM
3: NETWORK
10: INFORMATION PROCESSING SERVER (INFORMATION PROCESSING DEVICE)
12a: PRODUCT/SERVICE DB
12b STORE DB
12d MAP DB
30: TERMINAL DEVICE
33: DISPLAY UNIT
40, 42, 43, 44, 45, 46, 50, 52, 53, 54, 60, 61, 62: WEBPAGE (MAP DATA)
40a, 42b, 50a, 50b, 54a: STORE DISPLAY AREA
M1, M2, M3, M4, M5: MARK (INFORMATION INDICATING STORES)
T: TRAJECTORY (DESIGNATED AREA DESIGNATED BY BEING ENCIRCLED)

The invention claimed is:

1. An information processing device connected to a plurality of user terminal devices, the information processing device comprising:
at least one processor operable to read and operate according to instructions within a computer program; and
at least one memory operable to store at least portions of said computer program for access by said processor;
wherein said computer program includes code to cause said processor to implement:
a search word acquiring unit that acquires a search word related to a product, the search word being transmitted from a user terminal device;
a position information searching unit that refers to a memory unit that stores position information of a store which provides the product and stock information of the product which the store has, and searches for position information of a store which comprises a predetermined number of stocks of a product or more which is searched for from the search word acquired by the search word acquiring unit;
a map data generating unit that generates map data of a map on which information indicating the store is mapped, in accordance with the position information of the store searched for by the position information searching unit;
an output unit that outputs the map data to the user terminal device, the map data being displayed on a display area of a display of the user terminal device;
a density calculating unit that calculates a density of stores on the map in accordance with the position information of the store searched for by the position information searching unit;
an area setting unit that sets an area of a predetermined density of the stores or more calculated by the density calculating unit, on the map; and
a designated area acquiring unit that acquires information related to a designated area designated by a user operation on the map of the map data in the user terminal device, the designated area being transmitted from the user terminal,
wherein: the map data generating unit generates map data set so that the stores can be easily selected collectively,
the map data generating unit generates map data of the map on which the information related to the store is mapped only in the area set by the area setting unit for selecting the stores, and
in response to an input for designating an area of the display area of the display of the user terminal device by a user operation on the map of the map data, the map data generating unit adjusts the map data of the map such that information indicating stores positioned only in the designated area acquired by the designated area acquiring unit is displayed and information indicating stores positioned in a non-designated area that was previously displayed is no longer displayed, wherein the designated area and the non-designated area are displayed on the map of the map data after the map data is adjusted.

2. The information processing device according to claim 1, wherein the designated area acquiring unit acquires information related to the designated area designated by being encircled by the user operation on the map of the map data.

3. The information processing device according to claim 1, wherein the map data generating unit generates map data of an emphasized area set by the area setting unit.

4. The information processing device according to claim 1, further comprising a specific area acquiring unit that, when a plurality of areas are set by the area setting unit, acquires information related to a specific area specified by a user operation among the plurality of areas on the map of the map data,
  wherein the map data generating unit generates map data of an emphasized specific area.

5. The information processing device according to claim 1, wherein the position information searching unit searches for the position information in accordance with user store information from a user about the store which comprises the predetermined number of stocks of a product searched for from the search word acquired by the search word acquiring unit.

6. The information processing device according to claim 1, further comprising:
  a designated position acquiring unit that acquires information related to a position designated by a user operation on the map of the map data; and
  a road specifying unit that specifies a road on the map of the map data corresponding to the information related to the designated position acquired by the designated position acquiring unit,
  wherein the map data generating unit generates map data of a map on which information indicating only a store within a predetermined width from the road specified by the road specifying unit among stores mapped on the map is mapped.

7. The information processing device according to claim 1, further comprising a trajectory position acquiring unit that acquires information related to a position of a trajectory traced by a user operation on the map of the map data,
  wherein the map data generating unit generates map data of a map on which information indicating only a store within a predetermined width from the trajectory among stores mapped on the map is mapped based on the information related to the position of the trajectory acquired by the trajectory position acquiring unit.

8. The information processing device according to claim 1, wherein the density calculating unit calculates the density of stores on the map based on a number of clusters formed by stores within a predetermined distance on the map.

9. An information processing method of an information processing device that is connected to a plurality of user terminal devices and processes information, the information processing method comprising:
  a search word acquiring step of acquiring a search word related to a product, the search word being transmitted from a user terminal device;
  a position information searching step of referring to a memory unit that stores position information of a store which provides the product and stock information of the product which the store has, and searching for position information of a store which comprises a predetermined number of stocks of a product or more which is searched for from the search word acquired in the search word acquiring step;
  a map data generating step of generating map data of a map on which information indicating the store is mapped, in accordance with the position information of the store searched for in the position information searching step;
  an output step of outputting the map data to the user terminal device, the map data being displayed on a display area of a display of the user terminal device;
  a density calculating step of calculating a density of stores on the map in accordance with the position information of the store searched for in the position information searching step;
  an area setting step of setting an area of a predetermined density of the stores or more calculated in the density calculating step, on the map; and
  a designated area acquiring step of acquiring information related to a designated area designated by a user operation on the map of the map data in the user terminal device, the designated area being transmitted from the user terminal,
  wherein: in the map data generating step, map data set is generated so that the stores can be easily selected collectively;
  in the map data generating step, map data of the map on which the information related to the store is mapped only in the area set in the area setting step for selecting the stores is generated;
  in the designated area acquiring step, in response to an input for designating an area of the display area of the display of the user terminal device by a user operation on the map of the map data, the map data of the map is adjusted such that information indicating stores positioned only in the designated area acquired by the designated area acquiring unit is displayed and information indicating stores positioned in a non-designated area that was previously displayed is no longer displayed, wherein the designated area and the non-designated area are displayed on the map of the map data after the map data is adjusted; and
  at least one of the position information searching step, the map data generating step, and the density calculating step is performed by a processor.

10. The information processing method according to claim 9, wherein the density calculating step comprises calculating the density of stores on the map based on a number of clusters formed by stores within a predetermined distance on the map.

11. A computer apparatus connected to a user terminal, comprising:
  a communicator, a database, and a processor,
  wherein the processor is configured to generate map data of a map on which information indicating a store is mapped, by referring to the database that stores position information of a store which provides a product and stock information of the product the store has, and output the map data using the communicator,
  wherein the processor is further configured to calculate a density of stores in accordance with the position information of the store, set an area of a predetermined density of the stores or more, and acquire information related to a designated area designated by a user operation on the map of the map data, the map data being displayed on a display area of a display of the user terminal,
  wherein the information related to the store is mapped only in the set area, and
  in response to an input for designating an area of the display area of the display of the user terminal device by a user operation on the map of the map data, the processor is configured to adjust the map data of the map such that information indicating stores positioned only in the designated area is displayed and information indicating stores positioned in a non-designated area that was previously displayed is no longer displayed, wherein the designated area and the non-designated area are displayed on the map of the map data after the map data is adjusted.

* * * * *